US012720259B2

(12) United States Patent
Agarawal et al.

(10) Patent No.: US 12,720,259 B2
(45) Date of Patent: Aug. 25, 2026

(54) METHOD AND SYSTEM FOR PROVIDING IDEAL PLAYBACK POSITION FOR A ROBOTIC SPEAKER IN AN ENVIRONMENT

(71) Applicant: SAMSUNG ELECTRONICS CO., LTD., Suwon-si (KR)

(72) Inventors: Pulkit Agarawal, Uttar Pradesh (IN); Kaushal Kumar, Uttar Pradesh (IN); Gaurav Mishra, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 18/387,644

(22) Filed: Nov. 7, 2023

(65) Prior Publication Data

US 2024/0171909 A1 May 23, 2024

Related U.S. Application Data

(63) Continuation of application No. PCT/KR2023/015624, filed on Oct. 11, 2023.

(30) Foreign Application Priority Data

Nov. 21, 2022 (IN) ............................ 202211066874

(51) Int. Cl.
*H04S 7/00* (2006.01)
*G05D 1/00* (2006.01)
(Continued)

(52) U.S. Cl.
CPC ............. *H04R 3/04* (2013.01); *G05D 1/0255* (2013.01); *G05D 1/027* (2013.01); *G05D 1/0274* (2013.01);
(Continued)

(58) Field of Classification Search
CPC .......... H04S 7/303; H04S 7/305; H04S 7/302; H04R 3/04; H04R 1/323; H04R 29/001
See application file for complete search history.

(56) References Cited

U.S. PATENT DOCUMENTS 7,424,118 B2 * 9/2008 Mori ........................ H04R 3/12 381/104
7,840,308 B2 11/2010 Matsunaga et al.
(Continued)

FOREIGN PATENT DOCUMENTS

CN 204788411 U 11/2015
CN 105929827 A 9/2016
(Continued)

OTHER PUBLICATIONS

Yao, Shu-Nung et al., "Autonomous Technology for 2.1 Channel Audio Systems", Electronics, 2022, vol. 11, No. 339, https://doi.org/10.3390/electronics 11030339. (14 pages total).
(Continued)

*Primary Examiner* — Disler Paul
(74) *Attorney, Agent, or Firm* — Sughrue Mion, PLLC

(57) ABSTRACT

There is provided a method for providing a target position for a robotic speaker in an environment. The method includes receiving sensor information from one or more sensors related to the environment, obtaining at least one of initiation gesture information, position information, and face direction information based on the sensor information, the face direction information related to one or more users present in the environment, obtaining the target position of the robotic speaker in the environment by performing a calibration process based on the at least one of initiation gesture information, position information, or face direction
(Continued)

information and one or more and acoustic properties of the environment, and positioning the robotic speaker at the target position.

17 Claims, 25 Drawing Sheets

(51) Int. Cl.

| | |
|---|---|
| ***G06F 3/01*** | (2006.01) |
| ***G06F 3/0346*** | (2013.01) |
| ***G06T 7/70*** | (2017.01) |
| ***G06V 10/764*** | (2022.01) |
| ***G06V 20/50*** | (2022.01) |
| ***H04R 1/32*** | (2006.01) |
| ***H04R 3/04*** | (2006.01) |
| ***H04R 29/00*** | (2006.01) |

(52) U.S. Cl.

CPC ............ *G06F 3/017* (2013.01); *G06F 3/0346* (2013.01); *G06T 7/70* (2017.01); *G06V 10/764* (2022.01); *G06V 20/50* (2022.01); *H04R 1/323* (2013.01); *H04R 29/001* (2013.01); *H04R 29/008* (2013.01); *G06T 2207/30201* (2013.01); *H04R 2430/03* (2013.01)

(56) References Cited

U.S. PATENT DOCUMENTS

| | | | | |
|---|---|---|---|---|
| 9,591,402 | B2 * | 3/2017 | Ashcraft | H04S 7/305 |
| 10,225,656 | B1 | 3/2019 | Kratz et al. | |
| 10,362,430 | B2 | 7/2019 | Son et al. | |
| 10,567,871 | B1 | 2/2020 | Milne et al. | |
| 10,945,088 | B2 * | 3/2021 | Kobayashi | H04R 1/403 |
| 11,102,572 | B2 * | 8/2021 | Kobayashi | H04S 1/00 |
| 11,122,380 | B2 | 9/2021 | Beran | |
| 11,157,236 | B2 * | 10/2021 | Milne | H04S 7/301 |
| 11,256,878 | B1 * | 2/2022 | Scalisi | H04R 3/12 |
| 11,425,493 | B2 * | 8/2022 | Hassani | H04R 3/12 |
| 11,451,910 | B2 * | 9/2022 | Feilner | H04W 4/80 |
| 11,472,037 | B2 | 10/2022 | Hong et al. | |
| 11,507,134 | B2 * | 11/2022 | Yamamoto | G06F 1/1681 |
| 11,724,397 | B2 * | 8/2023 | Jeong | B25J 19/023 700/255 |
| 12,117,848 | B2 * | 10/2024 | Torii | B25J 11/001 |
| 2009/0312849 | A1 | 12/2009 | Cosgrove et al. | |
| 2014/0269207 | A1 * | 9/2014 | Baym | H04R 3/12 367/138 |
| 2018/0359595 | A1 | 12/2018 | Son et al. | |
| 2019/0082281 | A1 | 3/2019 | Beran | |
| 2019/0352006 | A1 | 11/2019 | Kratz et al. | |
| 2020/0005810 | A1 | 1/2020 | Park | |
| 2021/0014615 | A1 * | 1/2021 | Audfray | H04S 7/304 |
| 2021/0266663 | A1 | 8/2021 | Chen et al. | |
| 2021/0331324 | A1 | 10/2021 | Hong et al. | |

FOREIGN PATENT DOCUMENTS

| | | | |
|---|---|---|---|
| CN | 108245099 | A | 7/2018 |
| CN | 109272998 | A | 1/2019 |
| CN | 110717299 | A | 1/2020 |
| CN | 112188363 | B | 2/2022 |
| JP | 2018-117341 | A | 7/2018 |
| JP | 2019-126036 | A | 7/2019 |
| KR | 10-2012-0097607 | A | 9/2012 |
| KR | 10-1250610 | B1 | 4/2013 |
| KR | 10-2017-0066054 | A | 6/2017 |
| KR | 10-2019-0099377 | A | 8/2019 |
| TW | 1756607 | B | 3/2022 |
| TW | I756607 | B | 3/2022 |
| WO | 2006/100644 | A2 | 9/2006 |

OTHER PUBLICATIONS

International Search Report (PCT/ISA/210) and Written Opinion (PCT/ISA/237) issued by the International Searching Authority on Feb. 6, 2024 in corresponding International Application No. PCT/KR2023/015624.

Communication issued on Jul. 24, 2025 by the European Patent Office for European Patent Application No. 23894807.9.

Communication dated Dec. 1, 2025, issued by Intellectual Property India in Indian Application No. 202211066874.

* cited by examiner

Scenario 1

Scenario 2

Scenario 3

FIG. 8G

| | | | | | |
|---|---|---|---|---|---|
| | | | | | |
| | R | U | R | | |
| R | | Z | | | |
| R | | | A | | |
| | | | | | |

METHOD AND SYSTEM FOR PROVIDING IDEAL PLAYBACK POSITION FOR A ROBOTIC SPEAKER IN AN ENVIRONMENT

CROSS-REFERENCE TO RELATED APPLICATION(S)

This application is a bypass continuation application of International Application No. PCT/KR2023/015624, filed on Oct. 11, 2023, which us based on and claims priority under 35 U.S.C. § 119 to Indian Patent Application No. 202211066874, filed on Nov. 21, 2022, the disclosures of which are incorporated herein by reference in their entireties.

BACKGROUND

1. Field

The disclosure relates a robotic speaker and, more particularly, to a method and system for providing an ideal playback position for the robotic speaker in an environment.

2. Description of Related Art

Recently, audio speaker technology has gained popularity to provide high quality audio output. The speakers are electroacoustic transducers that convert an electrical audio signal into corresponding audio content such as music, audiobooks, and podcasts and enable users to access and enjoy the audio content. The speakers may be fixed speakers that have fixed positions or portable speaker. Generally speaking, even the portable speakers are fixed, however, their position adjustment is manual. Since audio quality perceived by the user may widely vary based on the position of the speaker, it is important to position of the speakers at an ideal location to enjoy the audio content. However, the user may not know the ideal position for the speaker to enjoy the best audio quality. Further, the audio quality is also dependent on the position of the user. However, related art speakers do not consider the position of the user and therefore lack in providing the best audio quality.

In addition, the interaction of the speakers with the environment also impacts the audio quality and the related art speakers are not capable of delivering audio quality based on acoustic characteristics of the room. Generally, the environment may include a more reflective environment (e.g., more reflective surface) or a less reflective environment (e.g., less reflective surface). Therefore, the audio reaching the ears of the user includes not only audio directly from the speaker, but also the audio delayed by traveling to one or more surfaces and from one or more surfaces. For example, the room surfaces act as sound absorbers. Therefore, the distance of the speaker with respect to absorbers and reflectors affects the audio quality of the speakers.

Further, due to audio reflections, low frequencies suffer interference and the audio response gets affected. This is known as Speaker Boundary Interference Response (SBIR). The SBIR reduces bass response, only because of poor speaker positioning.

Moreover, related art movable speakers do not move the speakers based on analyzing acoustic properties of the environment. As such, the related art movable speakers do not accurately position the speakers to produce optimal sound quality.

Therefore, there is a need for such a system that can provide the ideal position of the speaker based on the position of the user and room acoustics and mitigate or eliminate the effects of the SBIR by positioning the speaker in the ideal position in order to provide the best audio quality to the user.

SUMMARY

According to an aspect of the disclosure, there is provided a method including: receiving sensor information from one or more sensors related to an environment; obtaining at least one of initiation gesture information, position information, or face direction information based on the sensor information, the face direction information related to one or more users present in the environment; and obtaining a target position of a robotic speaker in the environment by performing a calibration process based on the at least one of initiation gesture information, the position information, or the face direction information and one or more acoustic properties of the environment; and positioning the robotic speaker at the target position.

According to an aspect of the disclosure, there is provided a system including: an electronic device configured to: receive sensor information from one or more sensors related to an environment; obtain at least one of initiation gesture information, position information, or face direction information based on the sensor information, the face direction information related to one or more users present in the environment; and a robotic device configured to: obtain a target position of a robotic speaker in the environment by performing a calibration process based on the at least one of initiation gesture information, position information, or face direction information and one or more acoustic properties of the environment; and position the robotic speaker at the target position.

According to an aspect of the disclosure, there is provided a non-transitory computer readable recording medium including a program for performing an operation for providing a target position for a robotic speaker in an environment, the operation comprising: receiving sensor information from one or more sensors related to the environment; obtaining at least one of initiation gesture information, position information, and face direction information based on the sensor information, the face direction information related to one or more users present in the environment; and obtaining the target position of the robotic speaker in the environment by performing a calibration process based on the at least one of initiation gesture information, position information, or face direction information and one or more and acoustic properties of the environment; and positioning the robotic speaker at the target position.

Accordingly, one or more embodiments of the disclosure provide a system, an apparatus and a method for identifying an optimal position of the speaker, with improved accuracy based on the position of the user and room acoustics, to output high quality audio to one or more users. Unlike the related art devices, a system, an apparatus and a method according to an embodiment may use a calibration device to identify a triggering gesture, identify the location of the user and face direction, and capture the audio response signal at the location of the user. Unlike the related art devices, a system, an apparatus and a method according to an embodiment may provide audio balance in both ears using a focus zone concept, which is based on the face direction of the user and is a major criterion for speaker positioning.

The foregoing summary is illustrative only and is not intended to be in any way limiting. In addition to the illustrative aspects, embodiments, and features described earlier, further aspects, embodiments, and features will become apparent by reference to the drawings and the following detailed description.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 8E-8G illustrate a pictorial representation of a cell grade providing sub-module and output of the cell grade providing sub-module according to one or more embodiments of the disclosure;

DETAILED DESCRIPTION

Figure 1:
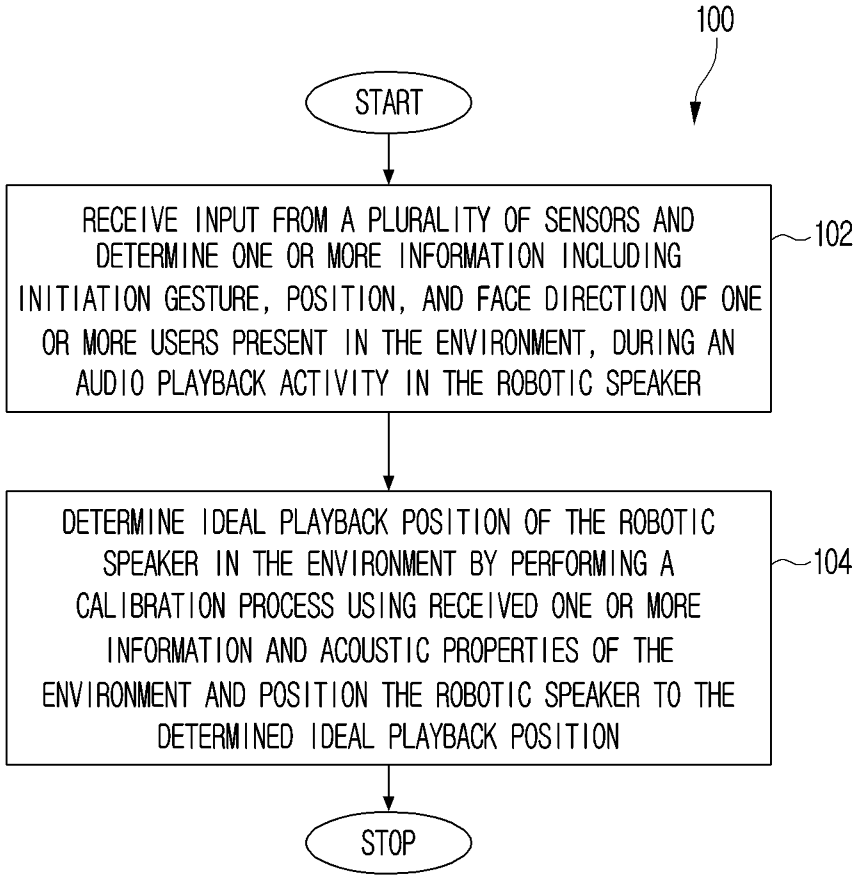
FIG. 1 illustrates a flow diagram showing a method for providing an ideal playback position for a robotic speaker in an environment according to one or more embodiments of the disclosure.

In the following description, numerous specific details are set forth in order to provide a thorough understanding of the disclosure. It will be apparent, however, to one skilled in the art that these specific details are only examples and not intended to be limiting. Additionally, it may be noted that the systems and/or methods are shown in block diagram form only in order to avoid obscuring the disclosure. It is to be understood that various omissions and substitutions of equivalents may be made as circumstances may suggest or render expedient to cover various applications or implementations without departing from the spirit or the scope of the disclosure. Further, it is to be understood that the phraseology and terminology employed herein are for the purpose of clarity of the description and should not be regarded as limiting.

Furthermore, in the description, references to "one embodiment" or "an embodiment" mean that a particular feature, structure, or characteristic described in connection with the embodiment is included in at least one embodiment of the disclosure. The appearance of the phrase "According to an embodiment" in various places in the specification is not necessarily refer to the same embodiment, nor are separate or alternative embodiments mutually exclusive of other embodiments. Further, the terms "a" and "an" used herein do not denote a limitation of quantity, but rather denote the presence of at least one of the referenced items. Moreover, various features are described which may be exhibited by some embodiments and not by others. Similarly, various requirements are described, which may be requirements for some embodiments but not for other embodiments.

As is traditional in the field, embodiments may be described and illustrated in terms of blocks, as shown in the drawings, which carry out a described function or functions. These blocks, which may be referred to herein as units or modules or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Referring to FIG. 1, a flow diagram showing a method (100) for providing an ideal playback position for a robotic speaker in an environment is illustrated. The system may be explained in conjunction with the method illustrated in FIG. 2. In the flow diagram, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 1 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine, a processor or a combination of a processor and memory.

According to an embodiment, in operation 102, the method may include receiving input from a plurality of sensors and determining and one or more information. For example, during an audio playback activity in the robotic speaker, a processor may receive input from a plurality of sensors and determine one or more information based on the received input from the plurality of sensors. The one or more information may include, but is not limited to, initiation gesture information, position information, and face direction information of one or more users present in the environment. According to an embodiment, the initiation gesture information may be used as an input trigger. According to an embodiment, the initiation gesture information may be indicate activation gesture to enable retrieving of a pre-calibrated position of a robotic speaker from storage. According to another embodiment, the initiation gesture information may indicate a calibration gesture to enable a calibration process for determining the ideal playback position of the robotic speaker with respect to the position and the face direction of the one or more users and the acoustic properties of the environment. According to an embodiment, a duration of an initiation gesture indicated by the initiation gesture information may be used to distinguish between the activation gesture and the calibration gesture. For example, the initiation gesture information may indicate the activation gesture if the one or more users place their hand wearing a smartwatch near to their ear for 2 seconds. In another embodiment, the initiation gesture may indicate the calibration gesture if the one or more users place their hand wearing a smartwatch near to their ear for more than 2 seconds. However, the disclosure is not limited to the two types of initiation gestures, and as such, according to another embodiment, the initiation gesture information may indicate other triggering events.

In operation 104, the method may include determining playback position of the robotic speaker and positioning the robotic speaker at the determined playback position. For example, the processor may determine the ideal playback position of the robotic speaker based on the one or more information, and the robotic speaker may be positioned at the determined ideal playback position. According to an embodiment, the ideal playback position of the robotic speaker is a position in the environment that is determined by performing a calibration process on the received one or more information and acoustic properties of the environment. The positioning the robotic speaker at the determined playback position may include controlling the robotic speaker to move to the determined playback position.

Figure 2:
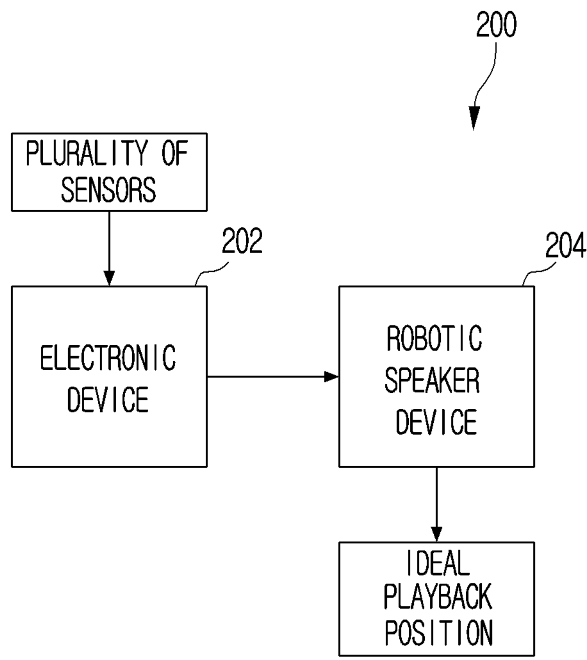
FIG. 2 illustrates a block diagram of a system for providing the ideal playback position for the robotic speaker in the environment according to one or more embodiments of the disclosure.

Referring to FIG. 2, a block diagram of a system 200 for providing the ideal playback position for the robotic speaker in the environment is illustrated according to one or more embodiments of the disclosure. The system may include a plurality of modules for determining and providing the ideal playback position for the robotic speaker in the environment. At least one of the plurality of modules may be implemented through an AI model. A function associated with AI may be performed through a non-volatile memory, a volatile memory, and a processor.

The processor may include one or more processors. For example, one or more processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or more processors control the processing of the input data in accordance with an operating rule or artificial intelligence (AI) model stored in the non-volatile memory and the volatile memory. The operating rule or artificial intelligence model is provided through training or learning. The operating rule may be predefined operating rule.

According to an embodiment, the operating rule or the artificial intelligence model is provided through training or learning means that, by applying a learning algorithm to a plurality of learning data, a predefined operating rule or AI model of the desired characteristic is generate. The learning may be performed in a device itself in which AI according to an embodiment is performed, and/or may be implemented through a separate server/system.

The AI model may include a plurality of neural network layers. Each layer has a plurality of weight values and performs a layer operation through the calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to decide or make a determination or prediction. Examples of learning algorithms include, but are not limited to, supervised learning, unsupervised learning, semi-supervised learning, or reinforcement learning.

According to an embodiment, the system may include an electronic device 202 and a robotic speaker device 204. The electronic device 202 may be configured to receive input from a plurality of sensors and determining one or more information during an audio playback activity in the robotic speaker. The one or more information includes the initiation gesture, position, and face direction of one or more users present in the environment. According to an embodiment, the plurality of sensors may be an inertial measurement unit (IMU) sensor that can include an accelerometer and a gyroscope, a magnetometer sensor, and a location sensor configured on the electronic device 202. According to an embodiment, the plurality of sensors are an integral part of the electronic device 202. The electronic device 202 may include, but is not limited to, a mobile phone, a computing device, a laptop, a notebook, a camera, and a wearable device such as a smartwatch, a smart band, and smart glasses. The electronic device 202 is explained in more detail with reference to FIG. 3.

According to an embodiment, the robotic speaker device 204 may be configured to determine 204 the ideal playback position of the robotic speaker in the environment by performing a calibration process using received one or more information and acoustic properties of the environment and positioning the robotic speaker to the determined ideal playback position. According to an embodiment, the robotic speaker device 204 may include, but is not limited to, a robotic vacuum cleaner and any other house-hold robotic device. According to an embodiment, the electronic device 202 and the robotic speaker device 204 are communicatively connected with each other via short range communication technology such as Bluetooth (BT), Bluetooth low energy (BLE), and Wi-Fi. However, the disclosure is not limited thereto, and as such, according to another embodiment, the electronic device 202 and the robotic speaker device 204 may be integrated or implemented in a single device. According to an embodiment, a robotic speaker may be implemented by the electronic device 202 including the features of the robotic speaker device 204. According to another embodiment, a robotic speaker may be implemented by the robotic speaker device 204 including features of the electronic device 202. The robotic speaker device 204 is explained in more detail with reference to FIG. 4.

Figure 3:
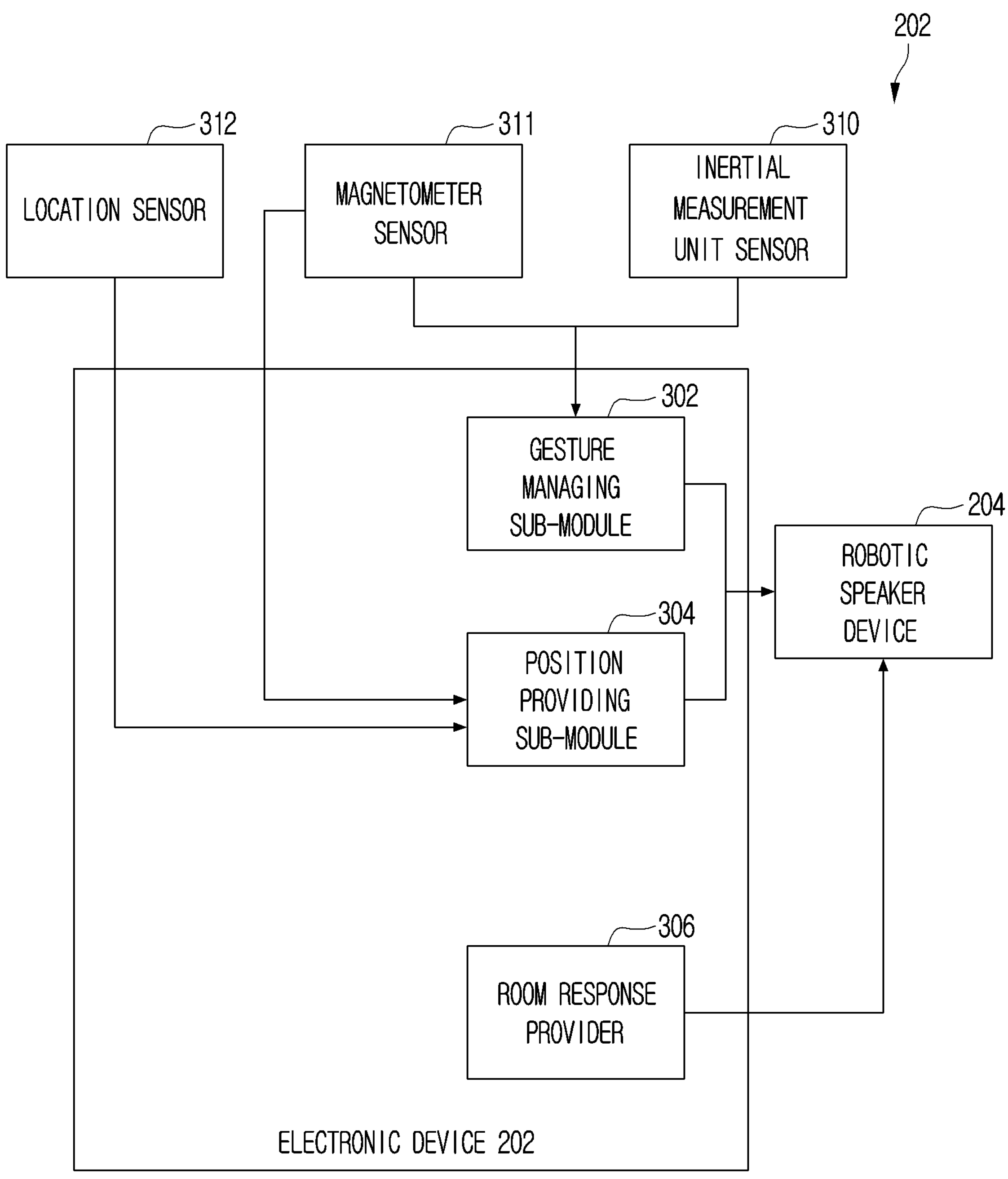
FIG. 3 illustrates a block diagram of an electronic device according to one or more embodiments of the disclosure.

Referring to FIG. 3 a block diagram of the electronic device 202 is illustrated according to one or more embodiments of the disclosure. As illustrated, the electronic device 202 may include a gesture managing sub-module 302, a position providing sub-module 304, and a room response provider (306). According to an embodiment, the electronic device 202 includes one or more memories and one or more processors. For example, the one or more memories may store one or more instructions or program code, and the processor may execute the one or more instructions from the one or memories to implement the various modules of the electronic device 202. However, the disclosure is not limited thereto, and as such, according to another embodiment, the modules of the electronic device 202 may be implemented by a combination of various electronic components.

According to an embodiment, the gesture managing sub-module 302 is configured to receive input from the inertial measurement unit (IMU) sensor 310 and the magnetometer sensor 311. The gesture managing sub-module 302 is further configured to recognize the initiation gesture and determine the initiation gesture based on the duration of the initiation gesture. The gesture managing sub-module 302 is further configured to provide the determined initiation gesture to the robotic speaker device 204. According to an embodiment, an artificial intelligence (AI) model is utilized for recognizing the initiation gestures.

According to an embodiment, the position providing sub-module 304 is configured to determine the position of the one or more users using input from the location sensor 312 and determine the direction of the electronic device 202 with respect to a geographical axis by utilizing input from the magnetometer sensor. In an embodiment, the location sensor 312 is an indoor positioning system and the direction of the electronic device 202 is determined with respect to the geographical north axis. The position-providing sub-module 304 is further configured to apply adjustment factor on the determined direction of the electronic device 202 for determining the face direction of the one or more users, and provide the position and face direction of the one or more users to the robotic speaker device 204. According to an embodiment, the adjustment factor may be applied with respect to the face of one or more users. According to an embodiment, the adjustment factor may be 90 degrees in an example case in which one of the one or more users has placed a finger on the ear. In another embodiment, the adjustment factor may be 180 degrees in an example case in which one of the one or more users has placed their palm on the back of the ear.

According to an embodiment, the room response provider 306 is configured to receive the recorded audio signal from the microphone of the electronic device 202 and perform sampling of the received audio signal at a frequency. The frequency may be a predefined or predetermined frequency. According to an embodiment, the sampling of the received audio signal may be performed at 44.1 kHz. The room response provider 306 is further configured to code each sample on a predefined bit. According to an embodiment, each sample may be coded on 16 bits. The room response provider 306 is further configured to provide pulse code modulated audio signal to the robotic speaker device 204.

Figure 4:
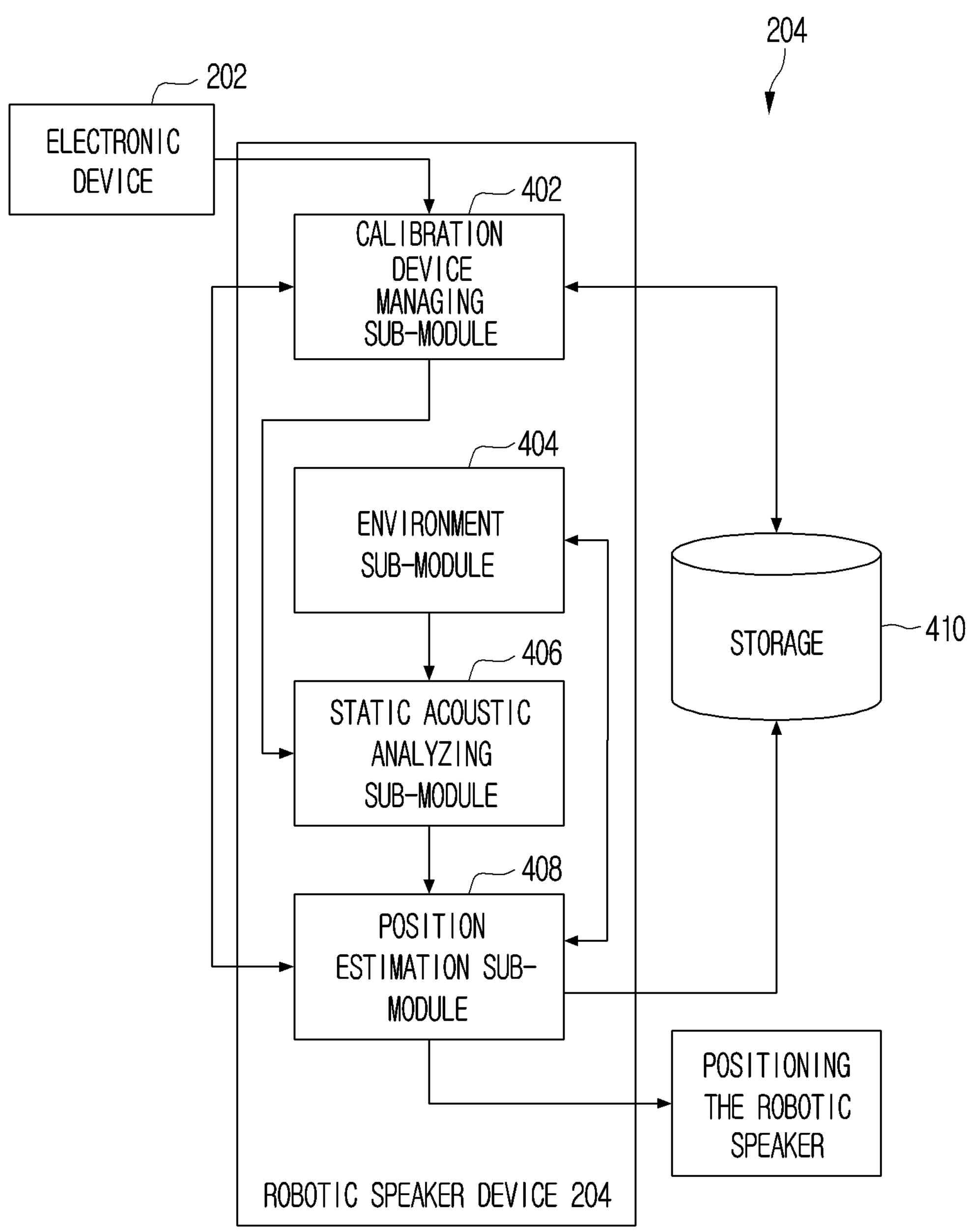
FIG. 4 illustrates a block diagram of a robotic speaker device according to one or more embodiments of the disclosure.

Referring to FIG. 4 a block diagram of the robotic speaker device 204 is illustrated according to one or more embodiments of the disclosure. The system may be explained in conjunction with the method illustrated in FIG. 5. As illustrated, the robotic speaker device 204 includes a calibration device managing sub-module 402, an environment sub-module 404, a static acoustic analyzing sub-module 406 and a position estimation sub-module 408. According to an embodiment, the robotic speaker device 204 includes one or more memories and one or more processors. For example, the one or more memories may store one or more instructions or program code, and the processor may execute the one or more instructions from the one or memories to implement the various modules of the robotic speaker device 204. However, the disclosure is not limited thereto, and as such, according to another embodiment, the modules of the robotic speaker device 204 may be implemented by a combination of various electronic components. For example, the robotic speaker device 204 may include motors, battery, actuators and other electronic components to facilitate movement of the robotic speaker device 204.

According to an embodiment, the calibration device managing sub-module 402 is configured to receive the one or more information including initiation gesture, position, and face direction of one or more users present in the environment and the recorded audio signal with respect to the position and face direction of the one or more users and acoustic properties of the environment from the electronic device 202.

According to an embodiment, the environment sub-module 404 is configured to create a floor map and an absorption map. According to an embodiment, the environment sub-module 404 may include 404*a* floor map generator (FMG) for creating a floor map of the environment and an absorption map generator for creating the absorption map of the environment. The method of creating the floor map and the absorption map is explained in more detail with reference to FIG. 6 and FIG. 7 respectively.

According to an embodiment, the static acoustic analyzing sub-module 406 is configured to receive the one or more information including the position and the face direction of the one or more users from the calibration device managing sub-module 402 and an absorption map of the environment from the environment sub-module 404. According to an embodiment, the absorption map of the environment is created based on the acoustic properties of the environment. The static acoustic analyzing sub-module 406 is further configured to compute a prioritized cell list by assigning priority to each cell of a focus zone in the absorption map. The prioritized cell list may be stored in a storage 410. The static acoustic analyzing sub-module 406 is explained in more detail with reference to FIG. 8A-8G.

According to an embodiment, the position estimation sub-module 408 is configured to manage the mobility of the robotic speaker on each cell of the focus zone based on the prioritized cell list. The position estimation sub-module 408 is further configured to monitor a calibration device managing sub-module 402 for one or more calibration interrupts from the one or more users. The position estimation sub-module 408 is further configured to compute frequency delta between the source audio signal and recorded audio signal received from the electronic device 202 via the calibration device managing sub-module 402 for each cell and positioning the robotic speaker at the cell of minimum frequency delta.

Figure 5:
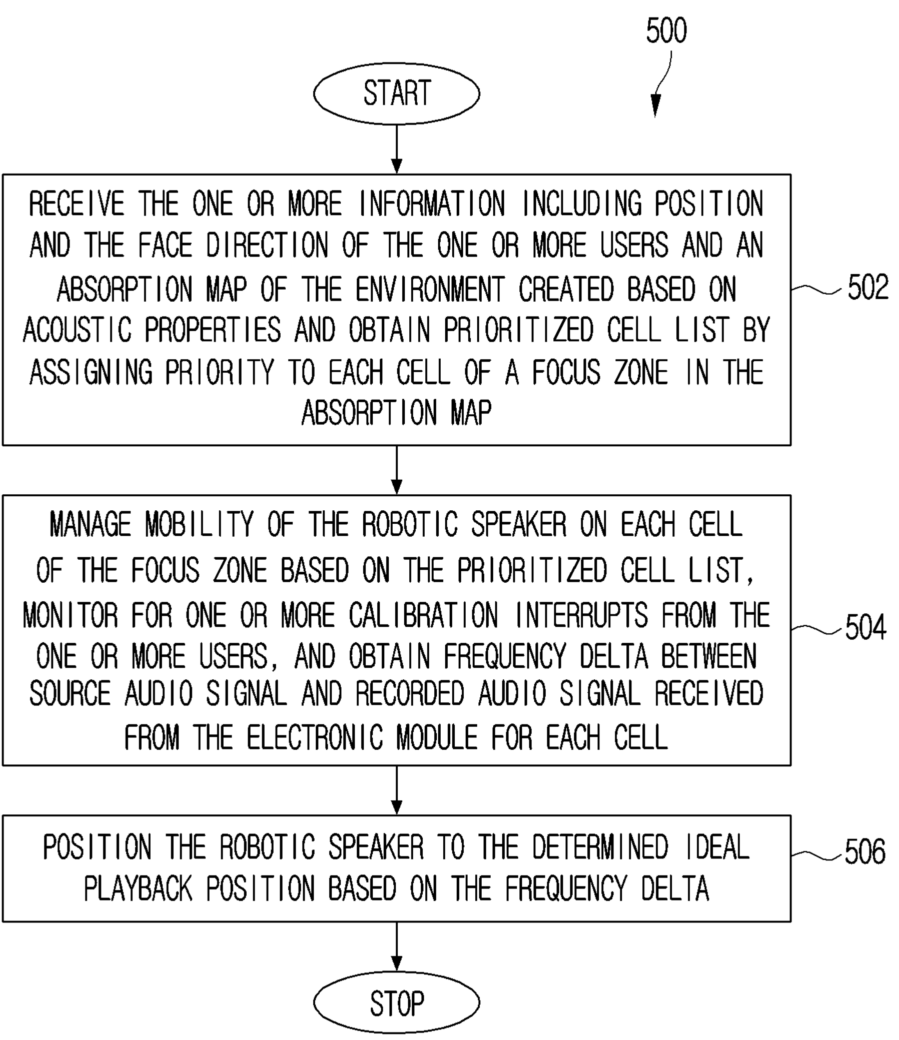
FIG. 5 illustrates a flow diagram showing a method for performing a calibration process to determine the ideal playback position of the robotic speaker in the environment according to one or more embodiments of the disclosure.

In FIG. 5, a flow diagram showing a method (500) for performing a calibration process to determine the ideal playback position of the robotic speaker in the environment is illustrated according to one or more embodiments of the disclosure. According to an embodiment, in operation 502, the method includes receiving one or more information and an absorption map of the environment and obtaining a prioritized cell list based on the received one or more information and the absorption map. For example, a processor may receive the one or more information and the absorption map of the environment created based on acoustic properties and compute a prioritized cell list based on the received one or more information and the absorption map. According to an embodiment, the prioritized cell list may be obtained by assigning priority to each cell of a focus zone in the absorption map.

In operation 504, the method may include managing the mobility of the robotic speaker, monitoring for one or more calibration interrupts from the one or more users, and obtaining a frequency delta. For example, the processor may successively manage the mobility of the robotic speaker is managed, monitor for one or more calibration interrupts from the one or more users, and compute the frequency delta. In an example, the calibration device managing sub-module 402 is monitored to identity whether one or more calibration interrupts are received from the one or more users. According to an embodiment, the mobility of the robotic speaker is managed on each cell of the focus zone based on the prioritized cell list. Further, the calibration device managing sub-module 402 is monitored for one or more calibration interrupts from the one or more users, and the frequency delta is obtained between source audio signals and recorded audio signal received from the electronic device 202 for each cell. In operation 506, the method may include positioning the robotic speaker based on the frequency delta. For example, the robotic speaker is positioned at a cell having a minimum frequency delta.

Figure 6:
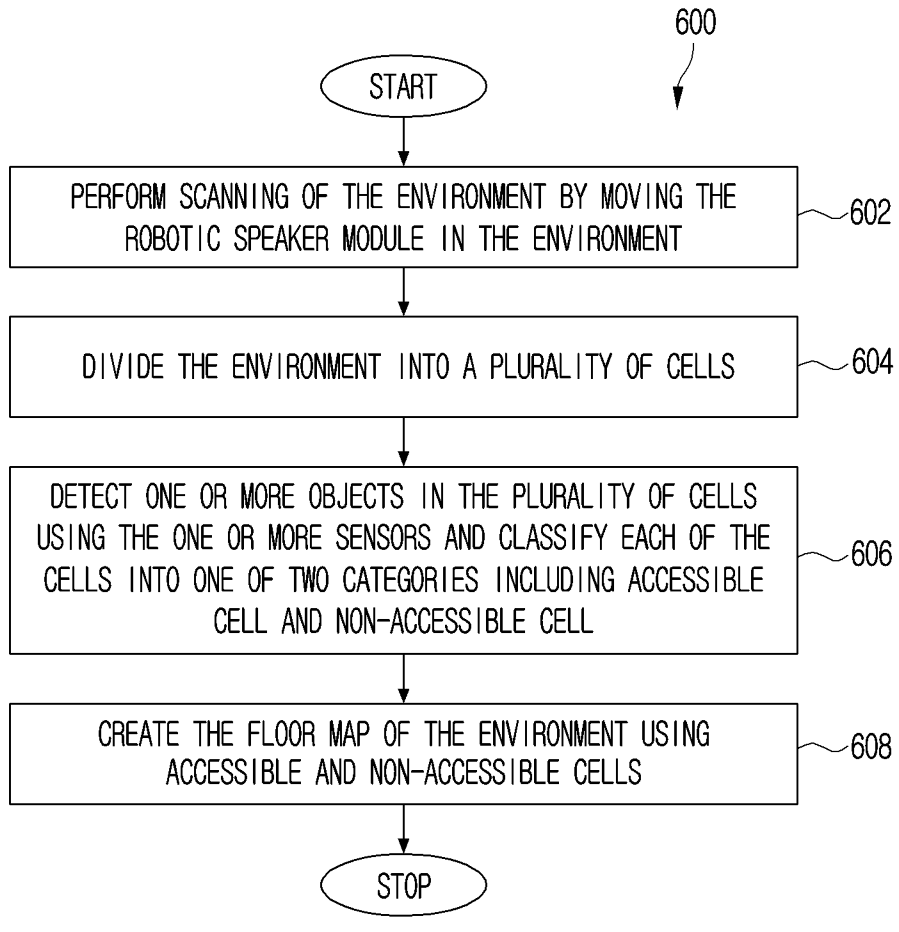
FIG. 6 illustrates a flow diagram showing a method for creating a floor map of the environment according to one or more embodiments of the disclosure.

Referring to FIG. 6 a flow diagram showing a method for creating a floor map of the environment is illustrated according to one or more embodiments of the disclosure. According to an embodiment, in operation 602, the method may include performing an operation of scanning the environment. For example, a processor may scan the environment. According to an embodiment, scanning of the environment is performed by moving the robotic speaker device 204 in the environment. According to an embodiment, in operation 604, the method may include dividing the environment into a plurality of cells. For example, the processor may divide the environment into a plurality of cells. According to an embodiment, in operation 606, the method may include detecting the one or more objects in the plurality of cells and classifying each of the cells into categories. For example, the processor may identify the one or more objects in the plurality of cells and classify each of the cells into one of a plurality of categories. For example, the processor may classify each of the cells into one of an accessible cell group and a non-accessible cell group. However, the disclosure is not limited thereto, and as such, according to another embodiment, more than two categories may be provided. According to an embodiment, the one or more objects such as sofa, book shelf, chair, etc. in the plurality of cells are detected using the one or more sensors present on the robotic speaker device 204. According to an embodiment, in operation 608, the method may include creating a floor map of the environment. For example, the processor may create the floor map of the environment using accessible and non-accessible cells. According to an embodiment, the accessible cells include all the cells which are available to the robotic speaker for self-positioning and non-accessible cells include occupied cells. In an embodiment, the non-accessible cells may include cells occupied by one or more objects such as sofa, book shelf, chair, etc.

Figure 7:
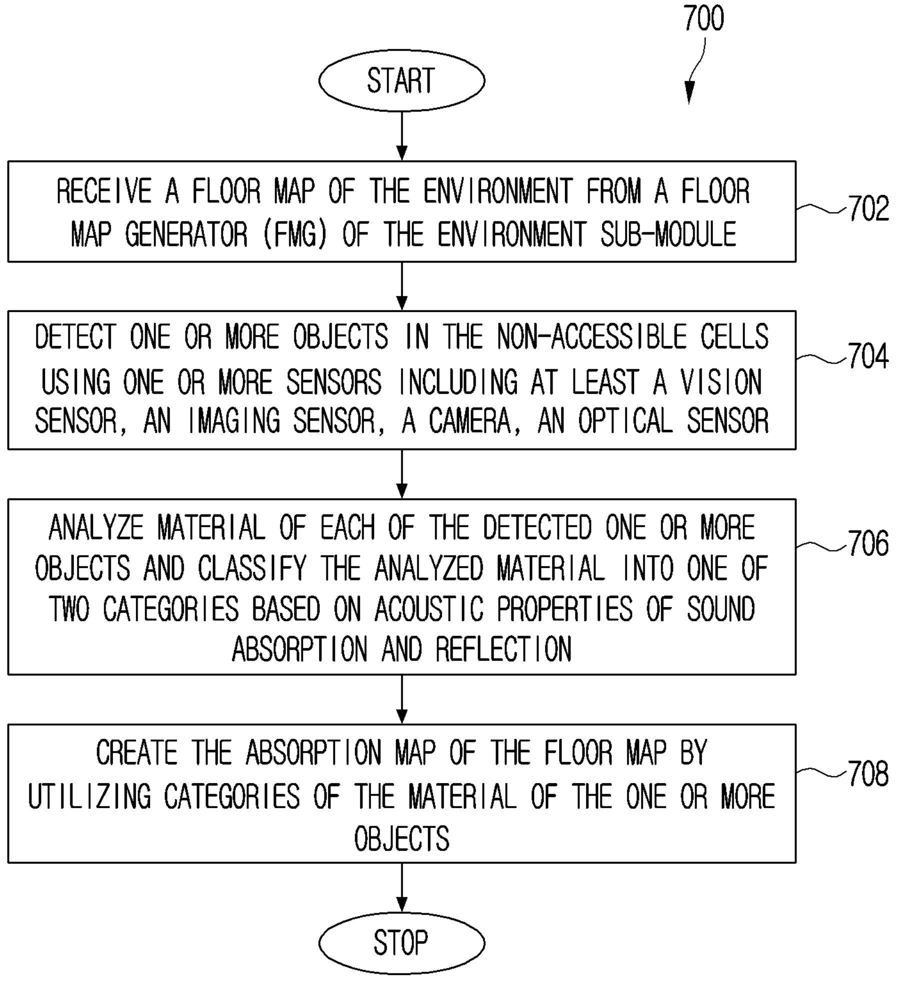
FIG. 7 illustrates a flow diagram showing a method for creating an absorption map of the environment according to one or more embodiments of the disclosure.

In FIG. 7, a flow diagram showing a method for creating the absorption map of the environment is illustrated according to one or more embodiments of the disclosure. According to an embodiment, in operation 702, the method may include receiving a floor map. For example, a processor may receive a floor map. According to an embodiment, the floor map may be received from a floor map generator (FMG), such as the FMG of the environment sub-module 404. According to an embodiment, in operation 704, the method may include detecting one or more objection. For example, the processor may detect one or more objects in the non-accessible cells using the one or more sensors. According to an embodiment, the one or more sensors include at least a vision sensor, an imaging sensor, a camera, and an optical sensor. According to an embodiment, in operation 706, the method may include analyzing a material of each of the detected one or more objects and classifying classified the analyzed material into a plurality of categories. For example, the process may analyze material of each of the detected one or more objects and classify the analyze material into one of the plurality categories based on acoustic properties of the material. For example, the processor may classify the analyze material into one of two categories, which may be sound absorption category and sound reflection category. According to an embodiment, the absorption and reflection is measured based on the acoustic absorption coefficient. Generally, the acoustic absorption coefficient is adopted as an index for evaluating the audio absorbing performances of the one or more objects present in the environment. According to an embodiment, in operation 708, the method may include creating a floor map. For example, the processor may create an absorption map of the floor map. According to an embodiment, the absorption map of the floor map is created by utilizing categories of the material of the one or more objects.

Figure 8A:
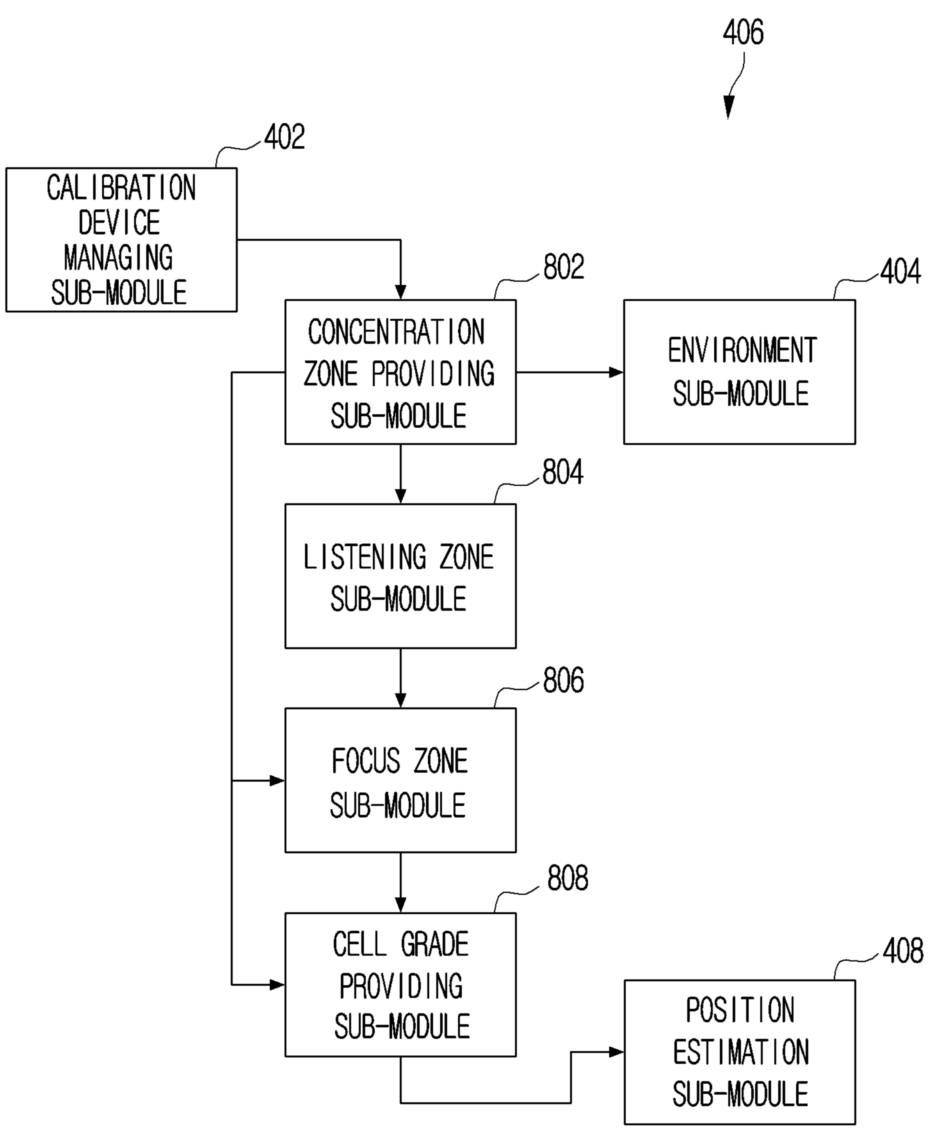
FIG. 8A illustrates a block diagram of a static acoustic analyzing sub-module according to one or more embodiments of the disclosure.

In FIG. 8A, a block diagram of a static acoustic analyzing sub-module is illustrated according to one or more embodiments of the disclosure. The operation of the static acoustic analyzing sub-module may be explained in conjunction with the method illustrated in FIG. 9. As illustrated, the static acoustic analyzing sub-module may include a concentration zone providing sub-module 802. The concentration zone providing sub-module 802 is configured to receive the position and face direction of the one or more users from the electronic device 202 via the calibration device managing sub-module 402 and the absorption map of the environment from the environment sub-module 404. The concentration zone providing sub-module 802 is further configured to determine a resultant position and resultant face direction based on the received position and face direction of the one or more users in the absorption map as illustrated in FIG. 8B.

Figure 8B:
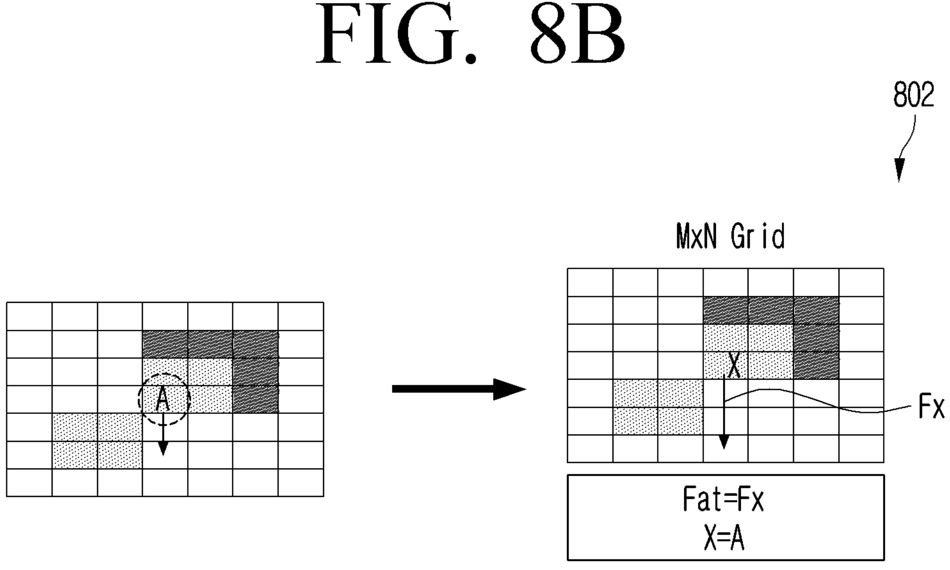
FIG. 8B illustrates a pictorial representation of concentration zones for one or more users according to one or more embodiments of the disclosure.
Figure 8B:
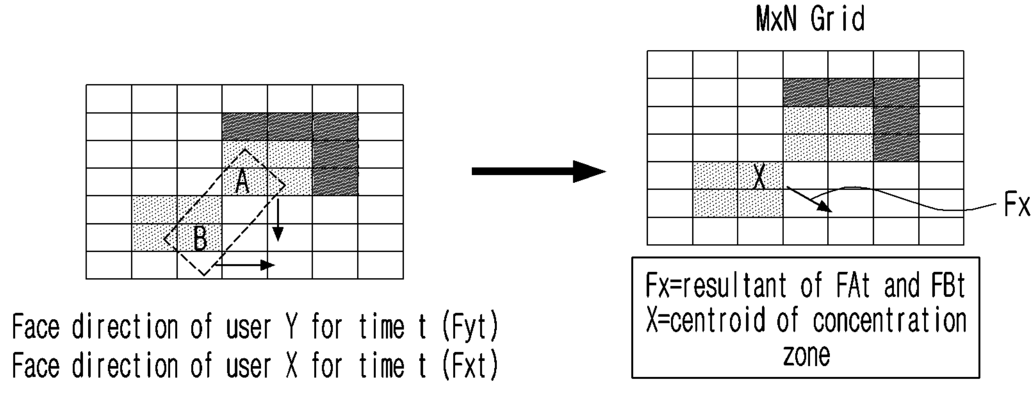
Figure 8B:
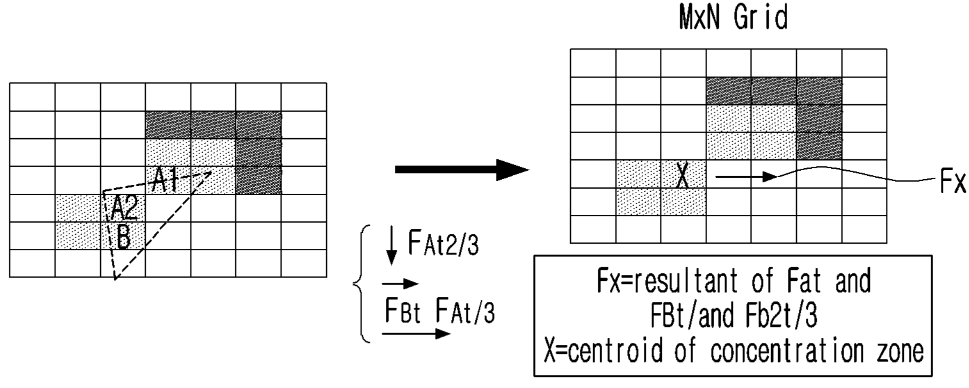

In FIG. 8B, scenario 1 illustrates the concentration zone for a single user. As illustrated, A inside the grid represents position of the user A, X represents the resultant position, Fx represents the resultant face direction and Fat represents the face direction of the user A at time t.

In FIG. 8B, scenario 2 illustrates the concentration zone for two users. As illustrated, A and B inside the grid disclose the position of the two users A and B, Fx represents the resultant face direction of the users A and B i.e. Fat and Fbt and x disclose the centroid of concentration zone or resultant position. Similarly, concentration zone for more than two can be illustrated.

In FIG. 8B, scenario 3 illustrates the concentration zone for two users, while one of the users is in motion. As illustrated, there are two users A and B and the user A is in motion. Moreover, B inside the grid represents the position of user B, A1 represents position of user A at time t/3, A2 represents position of user A at time 2t/3, X represents the resultant position, Fx represents the resultant face direction, Fat/3 represents the face direction of the user A for time t/3, Fat2/3 represents face direction of user A for time 2t/3, and Fbt represents face direction of user B for time t.

Figure 8C:
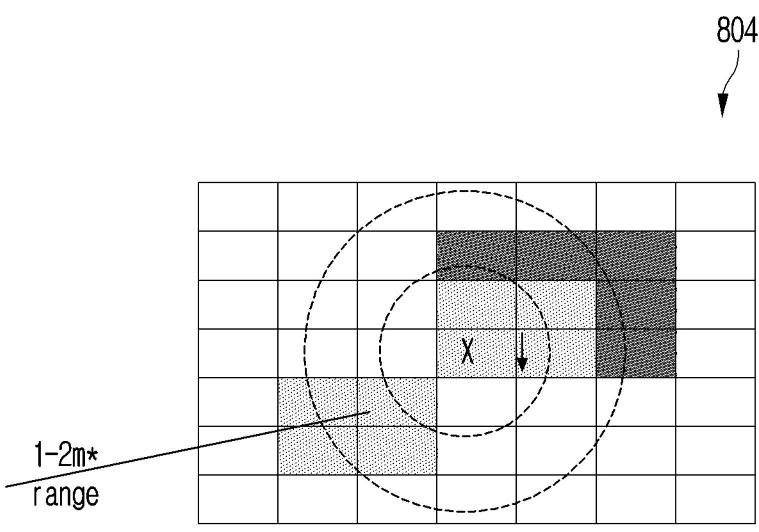
FIG. 8C illustrates a pictorial representation of the listening zone according to one or more embodiments of the disclosure.

The static acoustic analyzing sub-module may further include a listening zone sub-module 804. According to an embodiment, the listening zone sub-module 804 is configured to determine a listening zone in the absorption map around the determined resultant position and resultant face direction. The listening zone includes an area of a predefined range as illustrated in FIG. 8C. As illustrated, the listening zone includes all the accessible cells and considers the user position and face direction. The listening zone illustrated in FIG. 8C is in doughnut shape with a minimum distance of 1-2 m.

Figure 8D:
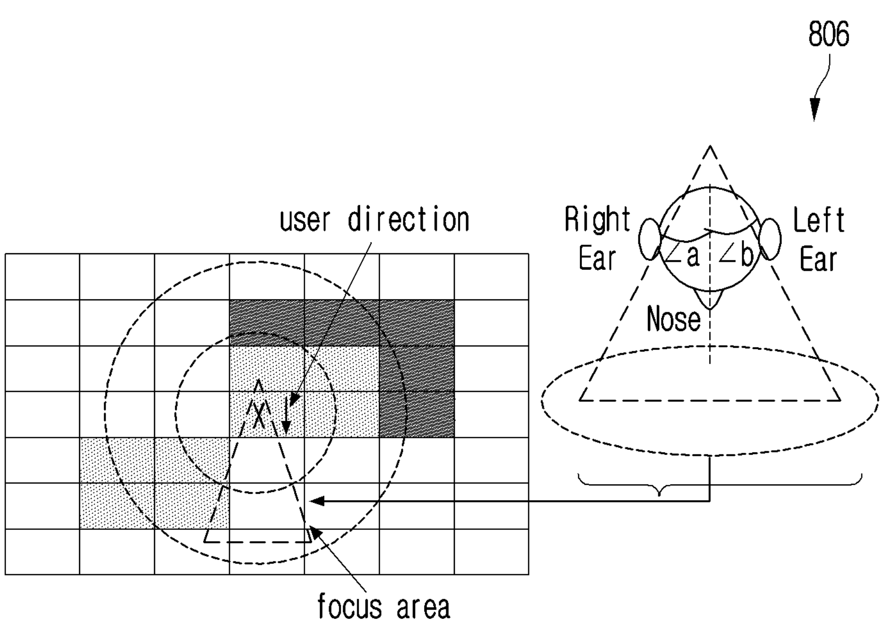
FIG. 8D illustrates a pictorial representation of the focus zone according to one or more embodiments of the disclosure.

The static acoustic analyzing sub-module may further include a focus zone sub-module 806. According to an embodiment, the focus zone sub-module 806 is configured to determine the focus zone on the listening zone based on the resultant face direction and line of sight of the one or more users. The focus zone is illustrated in FIG. 8D. As illustrated triangle area inside the listening zone is the focus zone, which is created using the angle between the ears and nose of the user (e.g., ∠a and ∠b). According to an embodiment, ∠a is an angle between the nose and right ear and ∠b is an angle between the nose and left ear. According to an embodiment, the angles ∠a and ∠b may be 15° to avoid inter-aural level difference. In another embodiment, the angles ∠a and ∠b may be other than 15°.

According to an embodiment, the max distance for calibration is equal to the Max calibration time*Speed (a) to cover 1 cell. For example, 10s*a (cell/sec), which is 10a cells. However, the disclosure is not limited thereto, and as such, according to another embodiment, the max distance for calibration may be determined using a different formula.

According to an embodiment, the cells in the focus zone may be selected based on a direct line of sight from the one or more users. For example, the cells in the focus zone may be selected when there is a direct line of sight from the one or more users. That is, the cells in the focus zone may be selected based on a determination that there is a direct line of sight from the one or more users.

Figure 8E:
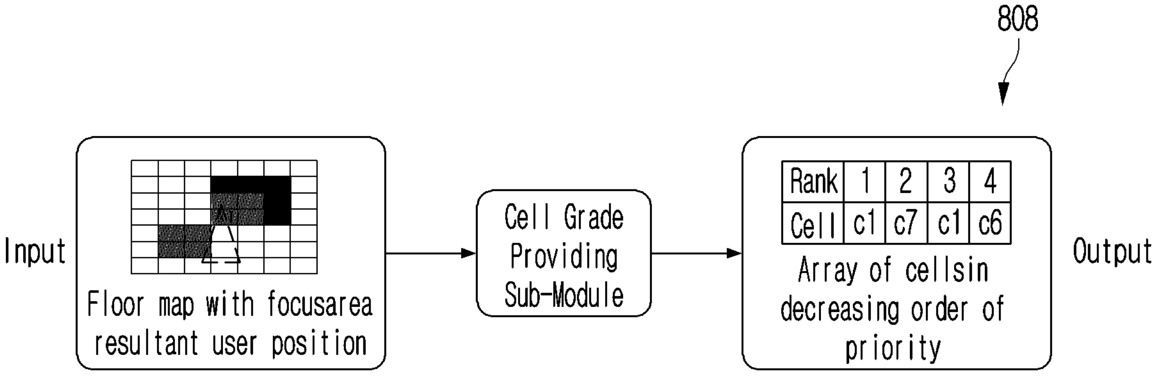
Figure 8F:
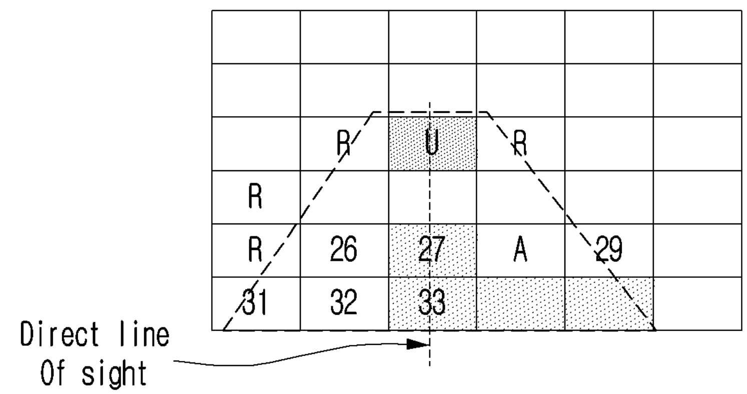

The static acoustic analyzing sub-module may further include a cell grade providing sub-module 808, which is illustrated in FIG. 8E. As shown in FIG. 8E, the cell grade providing sub-module 808 receives the floor map with the focus zone having the resultant user position (U) as shown in 8F and provides a prioritized cell list of cell grade rankers (CGR) in descending order. In FIGS. 8F and 8G, A represents an absorbent (e.g., an object with sound absorbing type material), R represents a reflectent (e.g., an object with sound reflecting type material), U represents user location and Z represents a location of the robotic speaker. According to an embodiment, the cell grade providing sub-module 808 is configured to assign priority to each cell of the focus zone based on the predefined criterion for the acoustic properties of the environment including line of sight cell identifier (LCI), reflective distance ranker (RDR), absorbent distance ranker (ADR), and user distance grid ranker (UDGR). According to an embodiment, the LCI provides all cells in line of sight of the one or more users, the RDR represents cells ranked in order of reflections property of the environment, the ADR represents cells ranked in the order of absorbents property of the environment, and the UDGR ranks the cell for positioning the robotic speaker to the line of sight and nearest to the one or more users.

Table 1 shows the RDR value for each cell in the focus zone and their respective ranks.

TABLE 1

RDR value for each cell and respective rank

| Cell No. | RDR | Rank |
|---|---|---|
| 26 | 4 | 2 |
| 27 | 3 | 3 |
| 29 | 0 | 6 |
| 31 | 1 | 5 |
| 32 | 2 | 4 |
| 33 | 5 | 1 |

Table 2 shows the ADR value for each cell in the focus zone and their respective ranks.

TABLE 2

ADR value for each cell and respective rank

| Cell No. | ADR | Rank |
|---|---|---|
| 26 | 2 | 4 |
| 27 | 1 | 2 |
| 29 | 1 | 2 |
| 31 | 4 | 6 |
| 32 | 3 | 5 |
| 33 | 0 | 1 |

Further, Table 3 shows the UDGR value for each cell in the focus zone and their respective ranks.

TABLE 3

| UDGR value for each cell and respective rank | | |
|---|---|---|
| Cell No. | UDGR | Rank |
| 26 | 3 | 2 |
| 27 | 2 | 1 |
| 29 | 4 | 4 |
| 31 | 5 | 6 |
| 32 | 4 | 4 |
| 33 | 3 | 2 |

The cell grade providing sub-module 808 is further configured to compute the prioritized cell list of cell grade ranker (CGR) in descending order. According to an embodiment, the CGR includes ranking summation of the RDR, ADR, and the UDGR to determine the prioritized cell list by cumulative assessment of individual ranks. Table 4 shows the CGR value for each cell in the focus zone and their respective ranks.

TABLE 4

| CGR value for each cell and respective rank | | |
|---|---|---|
| Cell No. | CGR | Rank |
| 26 | 8 | 3 |
| 27 | 6 | 2 |
| 29 | 12 | 4 |
| 31 | 17 | 6 |
| 32 | 13 | 5 |
| 33 | 4 | 1 |

Moreover, illustration "C" of FIG. 8E shows the position of the robotic speaker in the focus zone.

According to an embodiment, the RMS value is used to determine the rank of the RDR and the ADR, which is computed using the distance value between the speaker cell center and the middle point of the reflecting/absorbing surface through which the sound has the first reflection.

$$RMSX = \sqrt{\frac{\sum_{i=1}^{N} \sqrt{(X_A - Xi)^\wedge 2 + (Y_A - Yi)^\wedge 2}}{N}}$$

In case of the RDR, the RMS value is computed by considering the distance between the reflecting edges and the speaker cell. The higher the value of the RMS better is the ranking. For the ADR, the RMS value is computed by considering the distance between the absorbent edges and the speaker cell. The lesser the value of the RMS gives the better ranking.

In case of the UDGR, rank is determined by computing distance. The distance is considered equal to the vertical cell count from the user cell+horizontal cell count from user cell. The lesser the distance the better will be the rank. In case of the CGR, the lesser the ranking sum of RDR+ADR+UDGR, the better the ranking.

In case of ranking sum conflict at CGR, mean ranking is compared in the order of LCI>UDGR>RDR>ADR of that particular cell.

Figure 9:
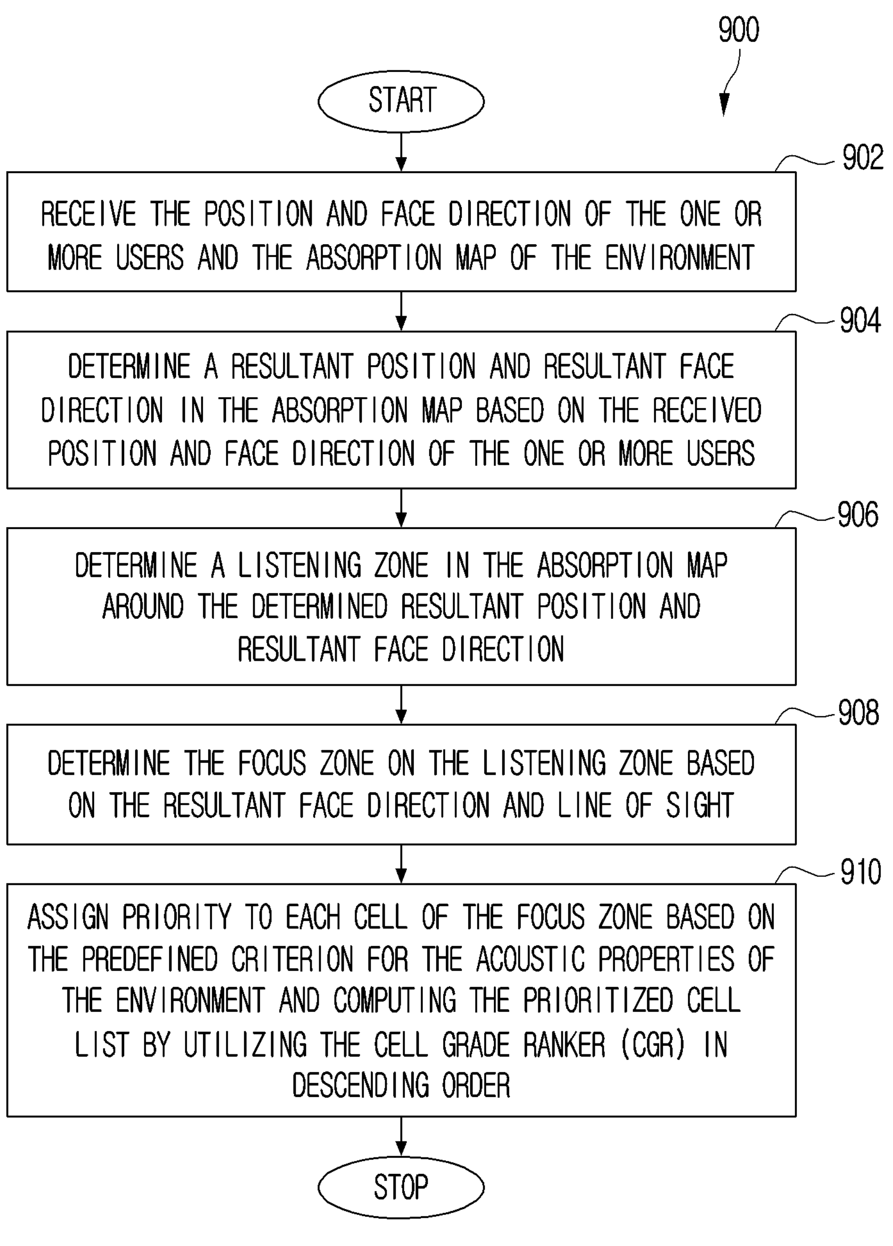
FIG. 9 illustrates a flow diagram showing a method of operation of the static acoustic analyzing sub-module according to one or more embodiments of the disclosure.

In FIG. 9, a flow diagram showing a method of operation of the static acoustic analyzing sub-module is illustrated according to one or more embodiments of the disclosure. As illustrated, the position and face direction of the one or more users and the absorption map of the environment are received, at operation 902. According to an embodiment, the position and face direction of the one or more users are received from the electronic device 202 via the calibration device managing sub-module 402, and the absorption map of the environment from the environment sub-module 404. Successively, a resultant position and resultant face direction is determined, at operation 904, in the absorption map. According to an embodiment, the resultant position and resultant face direction is determined based on the received position and face direction of the one or more users. Successively, a listening zone is determined, at operation 906, in the absorption map. According to an embodiment, the listening zone is determined in the absorption map around the determined resultant position and resultant face direction. According to an embodiment, the listening zone may include an area of a predefined range. Successively, the focus zone is determined, at operation 908. According to an embodiment, the focus zone is determined on the listening zone based on the resultant face direction and line of sight. Thereafter, priority is assigned to each cell of the focus zone based on the predefined criterion for the acoustic properties of the environment including line of sight cell identifier (LCI), reflective distance ranker (RDR), absorbent distance ranker (ADR), and user distance grid ranker (UDGR) and computing the prioritized cell list by utilizing the cell grade ranker (CGR) in descending order. According to an embodiment, the CGR includes a ranking summation of the RDR, ADR, and the UDGR.

Figure 10A:
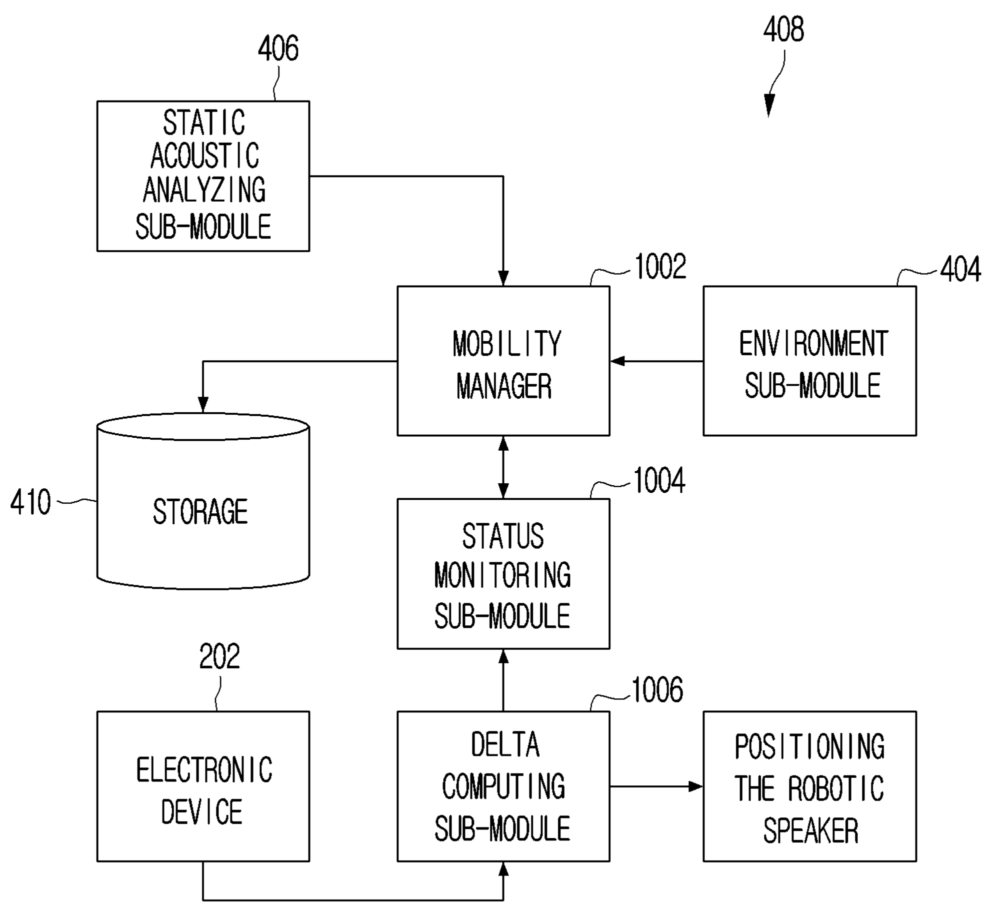
FIG. 10A illustrates a block diagram of a position estimation sub-module according to one or more embodiments of the disclosure.

Referring to FIG. 10A, the position estimation sub-module is illustrated according to one or more embodiments of the disclosure. As illustrated, the position estimation sub-module 408 may further include a mobility manager 1002. According to an embodiment, the mobility manager 1002 is configured to receive the prioritized cell list from the static acoustic analyzing sub-module 406 and the floor map from the environment sub-module 404. The mobility manager 1002 is further configured to manage the mobility of the robotic speaker on each cell of the prioritized cell list based on the priority, positioning the robotic speaker on the cell of the minimum frequency delta and storing information of the cell of minimum frequency delta along with prioritized cell list in the storage 410.

The position estimation sub-module 408 may further include a status monitoring sub-module 1004. According to an embodiment, the status monitoring sub-module 1004 is configured to create a session list for the prioritized cell list received from the mobility manager 1002. The status monitoring sub-module 1004 is further configured to monitor the calibration device managing sub-module 402 for one or more calibration interrupts and receiving the frequency delta value for each cell of the session list in case no one or more calibration interrupts or at each cell of updated session list in case the one or more calibration interrupts occur. The status monitoring sub-module 1004 is further configured to determine the minimum frequency delta and providing it to the mobility manager.

Figure 10B:
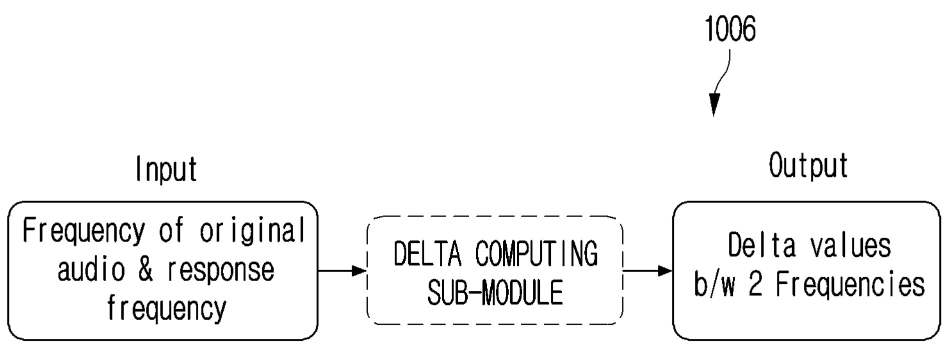
FIG. 10B illustrates a pictorial representation of the position estimation sub-module according to one or more embodiments of the disclosure.
Figure 10C:
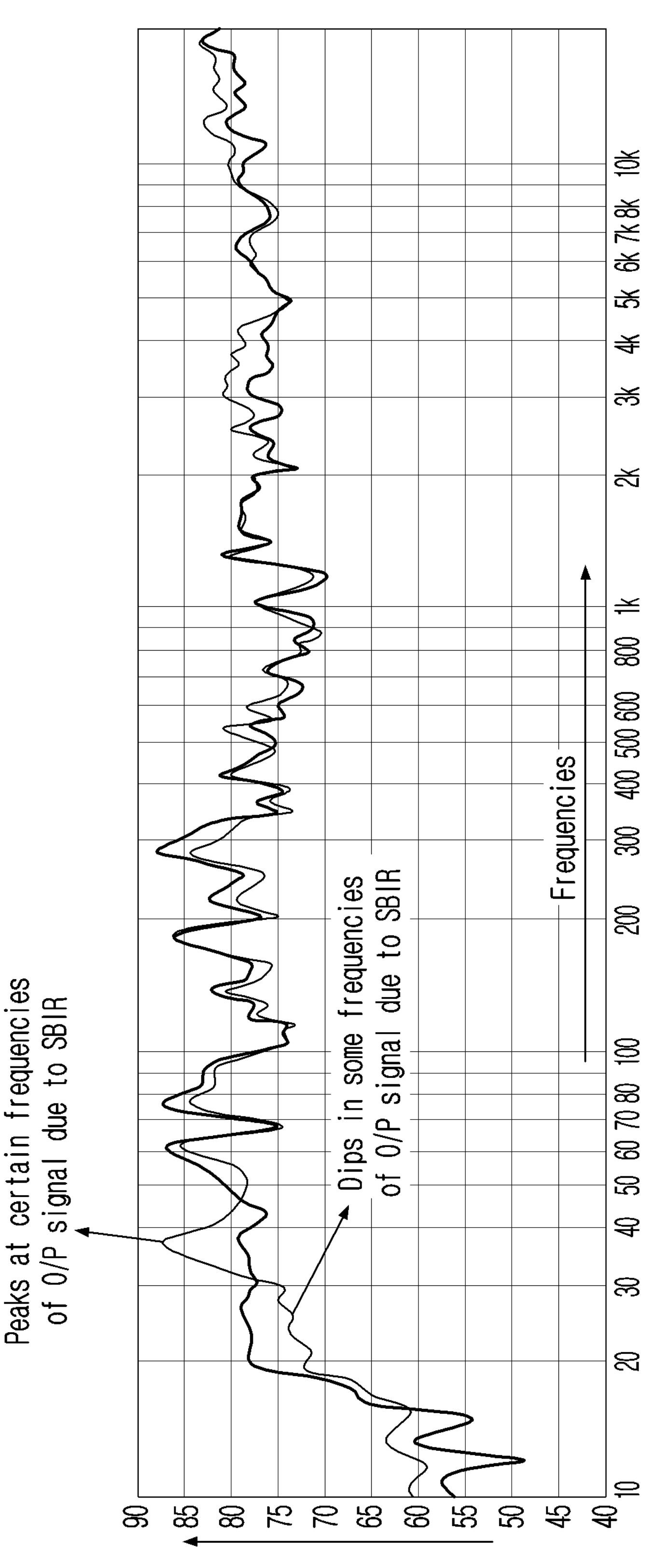
FIG. 10C illustrates a graphical representation of dips and peaks at different frequencies due to Speaker Boundary Interference Response (SBIR) according to one or more embodiments of the disclosure.

The position estimation sub-module 408 may further include a delta computing sub-module 1006, which is explained in conjunction with FIG. 10B. As illustrated, the delta computing sub-module 1006 is configured to receive frequency of original audio and response frequency, which is the recorded audio signal. The delta computing sub-module 1006 is further configured to compute the frequency delta between the source audio signal and the recorded audio signal received from the electronic device 202 via the calibration device managing sub-module 402 at each cell of the session list in case no one or more calibration interrupts or at each cell of the updated session list in case the one or more calibration interrupts occur. According to an embodiment, the frequency delta is computed in three frequency ranges which include bass frequencies from 20-300 Hz, mid frequencies from 300-5 kHz, and treble from 5k-20 kHz. FIG. 10C illustrates a graphical representation of dips and peaks at different frequencies due to speaker boundary interference response (SBIR) according to one or more embodiments of the disclosure.

Figure 11:
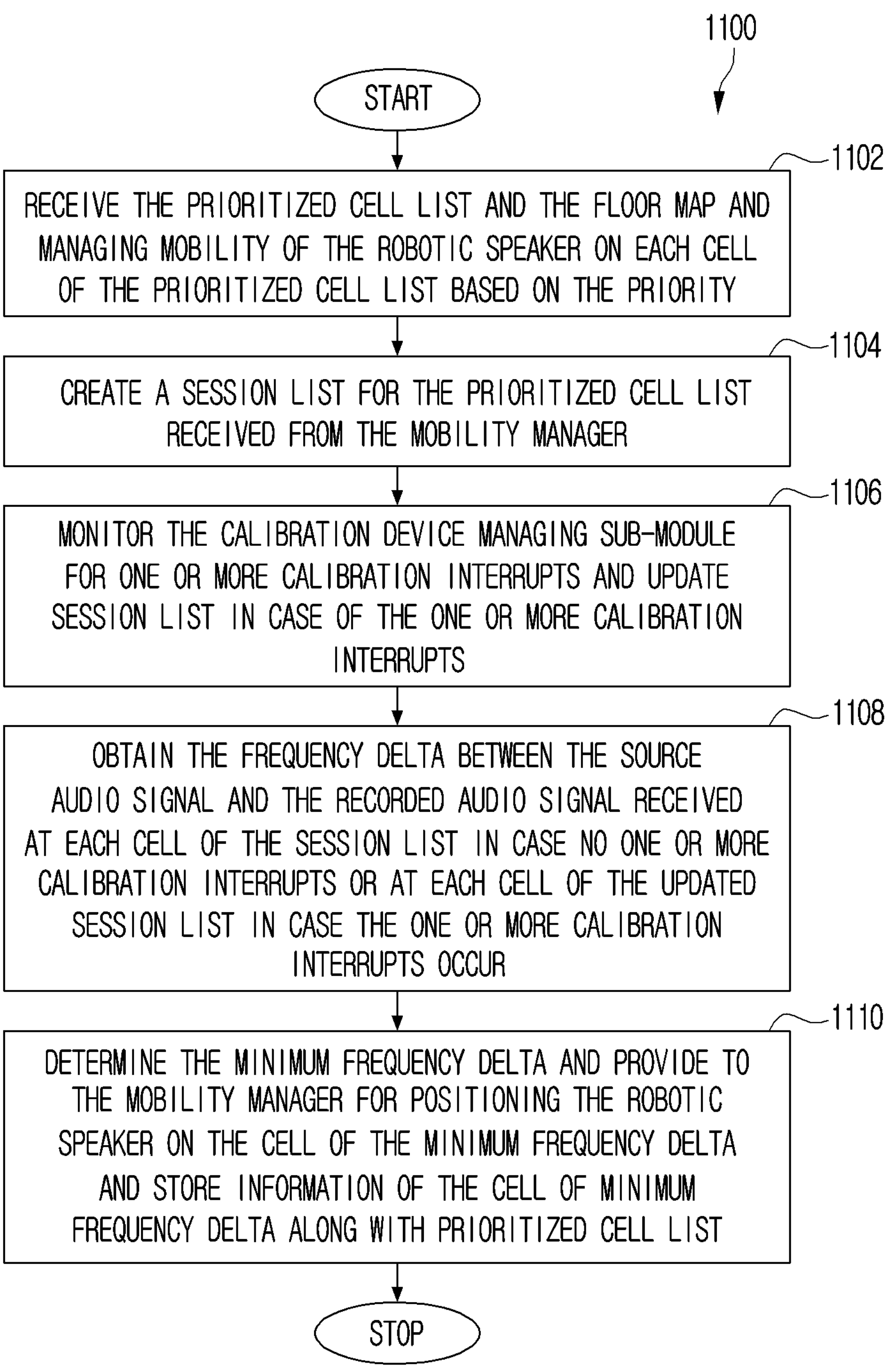
FIG. 11 illustrates a flow diagram showing a method of operation of the position estimation sub-module according to one or more embodiments of the disclosure.

The method of operation of the position estimation sub-module 408 is explained in detail in FIG. 11. As illustrated, the prioritized cell list and the floor map are received and the mobility of the robotic speaker on each cell of the prioritized cell list is managed, at operation 1102. Successively, a session list for the prioritized cell list received from the mobility manager 1002 is created, at operation 1104. Successively, the calibration device managing sub-module 402 is monitored, at operation 1106, for one or more calibration interrupts. In an example case in which one or more calibration interrupts are found, the session list is updated. In another example case, the session list is not updated. Successively, the frequency delta is computed, at operation 1108, which is explained in detail in FIG. 12. According to an embodiment, the frequency delta is computed between the source audio signal and the recorded audio signal received from the electronic device 202 at each cell of the session list in case no one or more calibration interrupts or at each cell of the updated session list in case the one or more calibration interrupts occur. Thereafter, the minimum frequency delta is determined and provided to the mobility manager 1002 for positioning the robotic speaker on the cell of the minimum frequency delta and storing information of the cell of minimum frequency delta along with prioritized cell list in the storage 410, at operation 1110.

Figure 12:
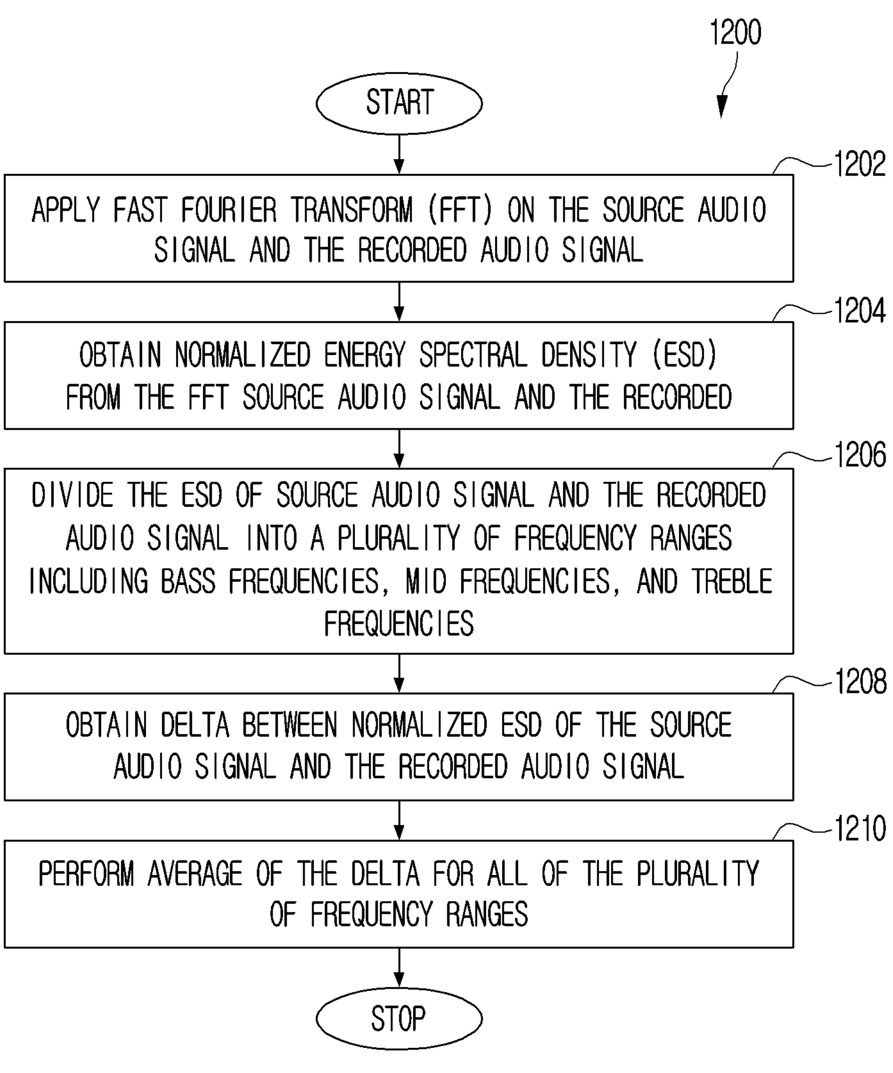
FIG. 12 illustrates a flow diagram showing a method of computing frequency delta between the source audio signal and recorded audio signal according to one or more embodiments of the disclosure.

Referring to FIG. 12 a flow diagram showing a method of computing frequency delta between the source audio signal and recorded audio signal is illustrated according to one or more embodiments of the disclosure. As illustrated, Fast Fourier Transform (FFT) is applied, at operation 1202. According to an embodiment, the FFT is applied on the source audio signal and the recorded audio signal. Successively, normalized energy spectral density (ESD) is computed, at operation 1204, from the FFT source audio signal and the recorded audio signal. According to an embodiment, the ESD is an even, nonnegative, and a real-valued function of frequency which represents the distribution of the energy of the signal in the frequency domain.

Successively, the ESD of source audio signal and the recorded audio signal is divided, at operation 1206, into a plurality of frequency ranges including bass frequencies, mid frequencies, and treble frequencies. Successively, the delta is computed between normalized ESD of the source audio signal and the recorded audio signal, at operation 1208. Thereafter, average of the delta for all of the plurality of frequency ranges is performed, at operation 1210.

Figure 13:
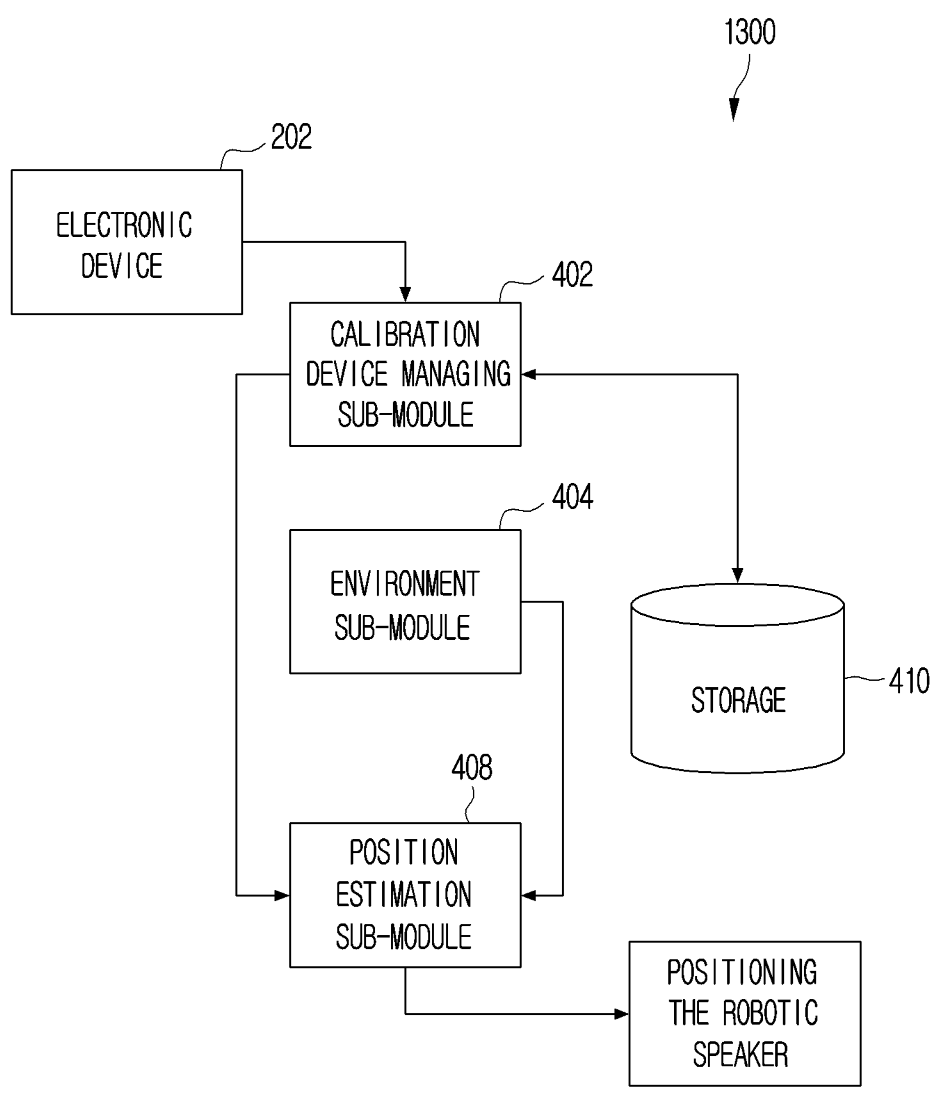
FIG. 13 illustrates a block diagram of the system for providing the ideal playback position stored in a storage according to one or more embodiments of the disclosure.

Referring to FIG. 13 a block diagram of the system for providing the ideal playback position stored in a storage 410 is illustrated according to one or more embodiments of the disclosure. The system may be explained in conjunction with the method illustrated in FIG. 14. As illustrated, the system may include the electronic device configured to receive input from a plurality of sensors, determine one or more information during an audio playback activity in the robotic speaker and provide to the robotic speaker device 204 which includes a calibration device managing sub-module 402. The calibration device managing sub-module 402 is configured to receive the one or more information including initiation gesture, position, and face direction of one or more users present in the environment and determining the ideal playback position stored in the storage 410. On successful, determination of the ideal playback position, the calibration device managing sub-module 402 is configured to provide the stored playback position to the position estimation sub-module 408. On receiving the stored playback position, the position estimation sub-module 408 is configured to receive the floor map from the environment sub-module 404 and locating the robotic speaker on the received playback position.

Figure 14:
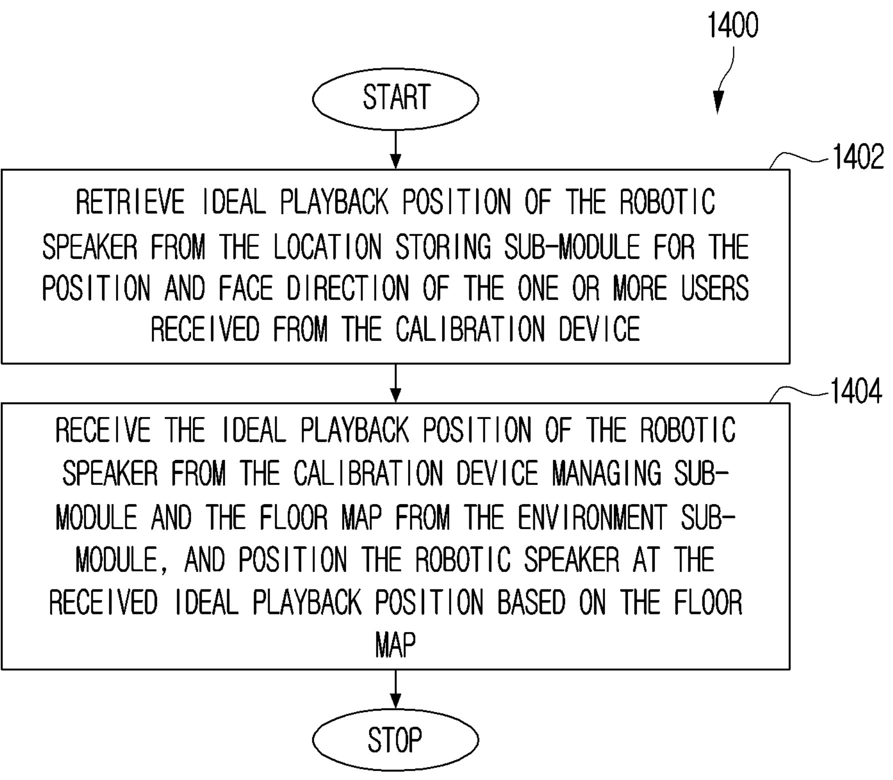
FIG. 14 illustrates a flow diagram showing a method of retrieving the pre-calibrated position from the storage according to one or more embodiments of the disclosure.

Referring to FIG. 14 a flow diagram showing a method of retrieving the pre-calibrated position from the storage 410 is illustrated according to one or more embodiments of the disclosure. As illustrated, the ideal playback position of the robotic speaker is retrieved, at operation 1402, from the storage 410 for the position and face direction of the one or more users received from the calibration device 102. Thereafter, the ideal playback position of the robotic speaker and the floor map is received and the robotic speaker is positioned, at operation 1404, at the received ideal playback position based on the floor map.

Figure 15:
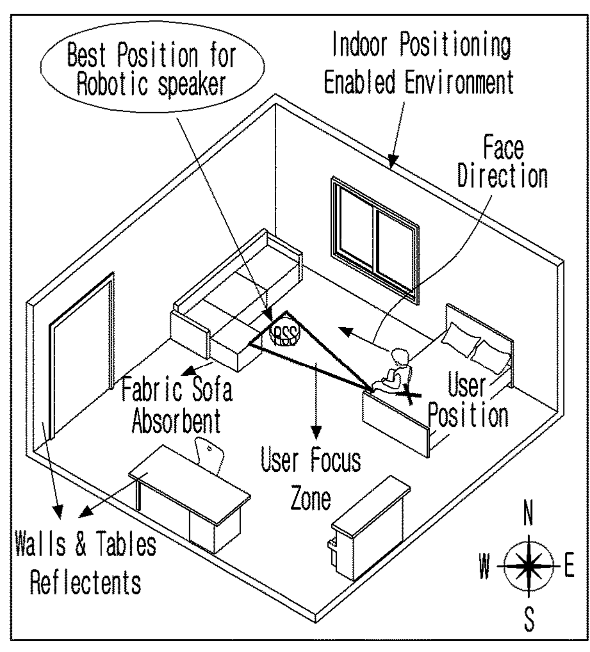
FIG. 15 illustrates a first example scenario for providing the ideal playback position for the robotic speaker in a single user environment according to one or more embodiments of the disclosure.
Figure 15:
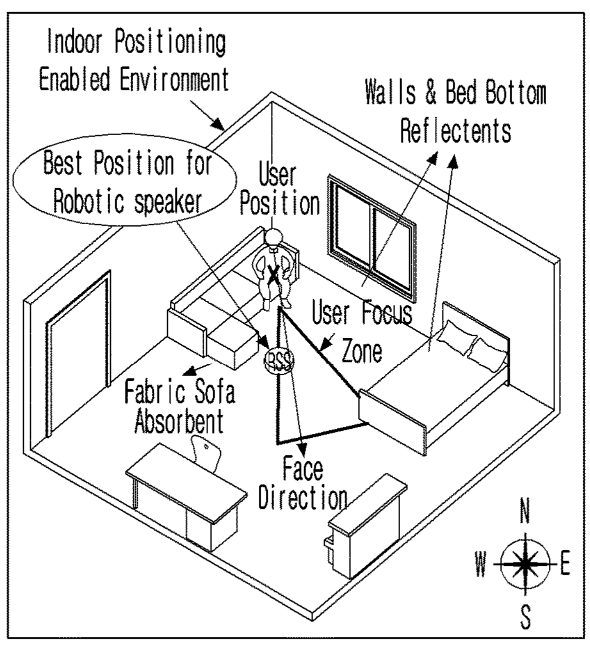

Referring to FIG. 15 a first example scenario for providing the ideal playback position for the robotic speaker in a single user environment is illustrated according to one or more embodiments of the disclosure. FIG. 15 illustrates two cases A and B to represent two different positions of the user in an environment. To provide better audio quality to the user sitting in the same environment but in different positions, the system illustrated according to an embodiment of the disclosure provides different ideal playback positions for the robotic speaker. In both cases, the system starts performing calibration on receiving gestures from the user through the wearable. On receiving the calibration gesture, the system determines the position and face direction of the user. Based on the position and face direction of the user in the environment, the focus zone is determined. Thereafter, the ranking of each cell in the focus zone is performed considering the position of the robotic speaker away from the walls and tables as these are reflectents (reflecting surfaces), and near to the fabric sofa that is an absorbent (absorbing surface). Using absorbent near to the robotic speaker reduces early reflections and thereby reduces SBIR. The system then enables the movement of the robotic speaker in all the determined positions as per the ranking, and based on the minimum frequency delta, the robotic speaker is placed at the position that is in line of sight of the user and has a minimum frequency delta.

Figure 16:
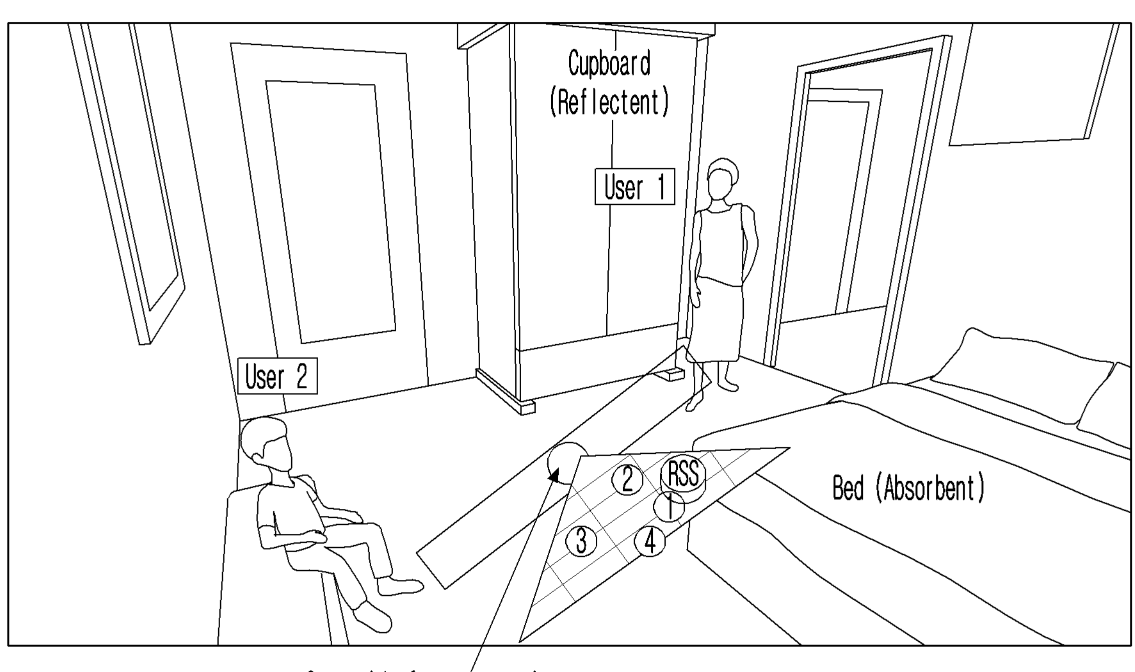
FIG. 16 illustrates a second example scenario for providing the ideal playback position for the robotic speaker in a multi-user environment according to one or more embodiments of the disclosure.

Referring to FIG. 16, a second example scenario for providing the ideal playback position for the robotic speaker in a multi-user environment is illustrated according to one or more embodiments of the disclosure. As illustrated, two users are listening to music in a room. To provide better audio quality to both of the users, the system according to an embodiment starts performing calibration on receiving gestures from either user 1 or user 2 through the wearable. On receiving the calibration gesture, the system determines the concentration zone between the two users, and thereafter, ranking is performed considering positions near the bed as this is an absorbent (absorbing surface), away from the cupboard as this is a reflectent (reflecting surface), and in line of sight of both of the users. The system then enables the movement of the robotic speaker in all the determined positions as per the ranking and, based on the minimum frequency delta, the robotic speaker is placed at the position of minimum frequency delta.

Figure 17:
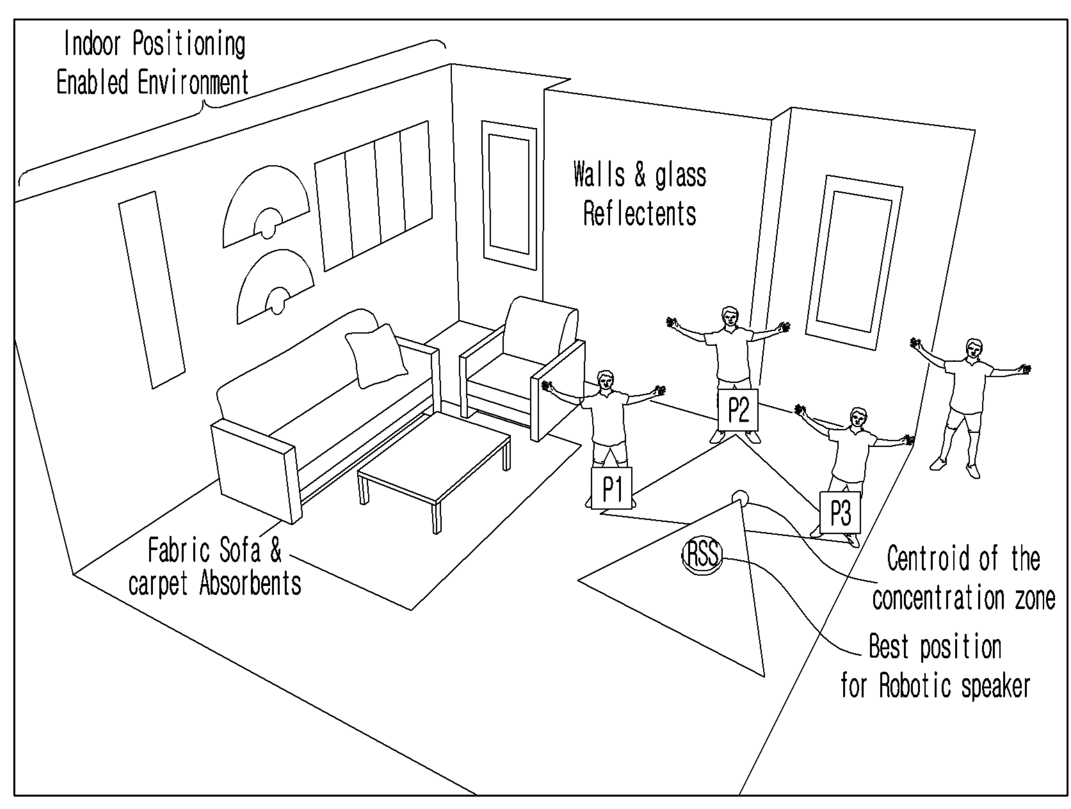
FIG. 17 illustrates a third example scenario for providing the ideal playback position for the robotic speaker in the single user environment, wherein the single user is in motion according to one or more embodiments of the disclosure.

Referring to FIG. 17, a third example scenario for providing the ideal playback position for the robotic speaker in the single user environment, wherein the single user is in motion, is illustrated according to one or more embodiments of the disclosure. As illustrated, the user is dancing to the music in the room. To provide better audio quality to the user, the system according to an embodiment starts performing calibration on receiving gestures from the user through the wearable. On receiving the calibration gesture, the system determines the user position at time t1, t2, and t3, and determines the user motion in a pattern. Thereafter, the concentration zone is determined and ranking is performed considering positions near to the bed, away from the walls and glass as these are reflectents (reflecting surfaces), and near to the fabric sofa and carpet considering these two as absorbents (absorbing surfaces). The system then enables the movement of the robotic speaker in all the determined positions as per the ranking and, based on the minimum frequency delta, the robotic speaker is placed at the position of minimum frequency delta.

As such, a system and/or a method for the robotic speaker in an environment according to an embodiment of the disclosure provide an ideal playback position with improved audio quality. A system and/or a method according to an embodiment of the disclosure may undergo modifications and variants, all of which are covered by the same inventive concept. Moreover, some or all of the details may be replaced by technically equivalent elements without departing from the spirit of the inventive concepts.

What is claimed is:

1. A method comprising:

receiving sensor information from one or more sensors related to an environment;

obtaining at least one of initiation gesture information, position information, or face direction information related to one or more users present in the environment, based on the sensor information;

determining a listening zone surrounding the one or more users based on the position information and the face direction information;

obtaining a target position, among positions within the listening zone, at which a robotic speaker is to be positioned in the environment to provide audio output to the one or more users by performing a calibration process based on the at least one of the initiation gesture information, the position information, or the face direction information and one or more acoustic properties of the environment; and moving, by a robotic device, the robotic speaker through the environment to the target position.

2. The method as claimed in claim 1, wherein the initiation gesture information indicates an activation gesture or a calibration gesture, based on a duration of a gesture indicated by the initiation gesture information, wherein the calibration gesture enables the calibration process for determining the target position of the robotic speaker with respect to the position information and the face direction information of the one or more users and the one or more acoustic properties of the environment, and wherein the activation gesture enables retrieving of a pre-calibrated position of the robotic speaker from a storage.

3. The method as claimed in claim 1, wherein the receiving the sensor information comprises receiving, by an electronic device, input from an inertial measurement unit (IMU) sensor, magnetometer sensor, or location sensor.

4. The method as claimed in claim 3, wherein the electronic device and the robotic device are communicatively connected with each other via short range communication technology, wherein the electronic device comprises one or more of a mobile phone, a computing device, a laptop, a notebook, a camera, a wearable device, a smartwatch, a smart band, or smart glasses, and wherein the robotic device comprises one of a robotic vacuum cleaner or a house-hold robotic device.

5. The method as claimed in claim 3, further comprising:

receiving input from the inertial measurement unit (IMU) sensor and the magnetometer sensor as the sensor information;

identifying the initiation gesture information based on the sensor information using an artificial intelligence (AI) model;

determining a type of an initiation gesture based on a duration of a gesture indicated by the initiation gesture information;

providing the type of the initiation gesture to the robotic device;

determining a position of the one or more users using input from the location sensor as the position information;

determining a direction of the electronic device with respect to a geographical north axis by utilizing the input from the magnetometer sensor;

applying an adjustment factor on the direction of the electronic device and determining the face direction of the one or more users as the face direction information;

providing the position information and the face direction information of the one or more users to the robotic device;

receiving an audio signal from a microphone of the electronic device;

performing sampling of the audio signal at a first frequency;

coding each sample on a bit; and providing a pulse code modulated audio signal to the robotic device.

6. The method as claimed in claim 3, wherein the calibration process comprises:

receiving the position information, the face direction information of the one or more users and an absorption map of the environment created based on the one or more acoustic properties;

obtaining a prioritized cell list by assigning priority to one or more cells of a focus zone in the absorption map based on the position information and the face direction information of the one or more users;

controlling mobility of the robotic speaker on the one or more cells of the focus zone based on the prioritized cell list;

monitoring for one or more calibration interrupts from the one or more users;

obtaining a frequency delta between a source audio signal and a recorded audio signal received from the electronic device for the one or more cells of the focus zone; and positioning the robotic speaker at a first cell, among the one or more cells, having a minimum frequency delta.

7. The method as claimed in claim 6, wherein the absorption map of the environment is created by an absorption map generator (AMG) by performing operations of:

receiving a floor map of the environment from a floor map generator (FMG), the floor map including accessible cells which are available to the robotic speaker for self-positioning and non-accessible cells which are occupied;

detecting one or more objects in the non-accessible cells using one or more of a vision sensor, an imaging sensor, a camera, or an optical sensor;

analyzing a material of each of the one or more objects and classifying the analyzed material into one of two first categories based on the one or more acoustic properties of sound absorption and sound reflection, wherein the sound absorption and the sound reflection are measured based on an acoustic absorption coefficient; and creating the absorption map of the floor map based on the classifying of the material of the one or more objects into the two categories.

8. The method as claimed in claim 7, wherein the floor map is created by performing operations of:

performing scanning of the environment by moving the robotic device in the environment;

dividing the environment into a plurality of cells;

detecting the one or more objects in the plurality of cells using the one or more sensors and classifying each of the plurality of cells into one of two second categories comprising an accessible cell category and a non-accessible cell category; and creating the floor map of the environment using accessible cells and non-accessible cells based on the classifying of each of the plurality of cells into the accessible cell category or the non-accessible cell category.

9. The method as claimed in claim 6, wherein the prioritized cell list is obtained by:

receiving the position information, the face direction information of the one or more users from the electronic device and the absorption map of the environment;

determining a resultant position and resultant face direction in the absorption map based on the position information and the face direction information of the one or more users;

determining the listening zone in the absorption map based on the resultant position and the resultant face direction, the listening zone comprises an area of a first range surrounding the resultant position and the resultant face direction;

determining the focus zone on the listening zone based on the resultant face direction and line of sight; and assigning priority to each cell of the focus zone based on the one or more acoustic properties of the environment, wherein the one or more acoustic properties of the environment comprises at least one of line of sight cell identifier (LCI), reflective distance ranker (RDR), absorbent distance ranker (ADR), or user distance grid ranker (UDGR), and wherein the prioritized cell list is obtained by utilizing a cell grade ranker (CGR) in descending order, the CGR comprising ranking summation of the RDR, ADR, and the UDGR.

10. The method as claimed in claim 6, wherein the moving of the robotic speaker comprises:

receiving the prioritized cell list and a floor map of the environment;

managing mobility of the robotic speaker on each cell of the prioritized cell list based on a priority;

creating a session list for the prioritized cell list;

monitoring for the one or more calibration interrupts and updating the session list based on the one or more calibration interrupts;

obtaining the frequency delta between the source audio signal and the recorded audio signal received from the electronic device at each cell of the session list based on no occurrence of the one or more calibration interrupts or at each cell of the updated session list based on occurrence of the one or more calibration interrupts;

determining the minimum frequency delta;

providing the minimum frequency delta for positioning the robotic speaker on the first cell of the minimum frequency delta; and storing information of the first cell of the minimum frequency delta along with the prioritized cell list in a storage.

11. The method as claimed in claim 10, wherein the obtaining the frequency delta between the source audio signal and the recorded audio signal comprises:

applying Fast Fourier Transform (FFT) on the source audio signal and the recorded audio signal;

obtaining normalized energy spectral density (ESD) from the FFT source audio signal and the recorded audio signal;

dividing the ESD of the source audio signal and the recorded audio signal into a plurality of frequency ranges including bass frequencies, mid frequencies, and treble frequencies;

obtaining a delta between normalized ESD of the source audio signal and the recorded audio signal; and performing an average of the delta for all of the plurality of frequency ranges.

12. The method as claimed in claim 1, wherein the target position of the robotic speaker in the environment is determined by retrieving a pre-calibrated position from a storage based on the position information and the face direction information.

13. The method as claimed in claim 12, wherein the moving the robotic speaker through the environment to the target position comprises:

retrieving the target position of the robotic speaker from the storage corresponding to the position information and the face direction information of the one or more users; and positioning the robotic speaker at the target position based on a floor map.

14. The method as claimed in claim 1, wherein the calibration process comprises:

performing scanning of the environment by moving the robotic device through the environment, and classifying one or more objects in the environment based on one or more acoustic properties of sound absorption and sound reflection, the sound absorption and the sound reflection being measured based on acoustic absorption coefficient.

15. The method as claimed in claim 1, wherein the calibration process comprises:

receiving the position information and the face direction information of the one or more users, and an absorption map of the environment that classifies acoustic properties of one or more objects in the environment, and obtaining a prioritized cell list of one or more cells in the absorption map based on the position information and the face direction information of the one or more users.

16. A system comprising:

an electronic device configured to:

receive sensor information from one or more sensors related to an environment; and obtain at least one of initiation gesture information, position information, or face direction information related to one or more users present in the environment, based on the sensor information; and a robotic device configured to:

determine a listening zone surrounding the one or more users based on the position information and the face direction information;

obtain a target position, among positions within the listening zone, at which a robotic speaker is to be positioned in the environment to provide audio output to the one or more users by performing a calibration process based on the at least one of the initiation gesture information, the position information, or the face direction information and one or more acoustic properties of the environment; and move the robotic speaker through the environment to the target position.

17. A non-transitory computer readable recording medium including a program for performing an operation for providing a target position at which a robotic speaker is to be positioned in an environment, the operation comprising:

receiving sensor information from one or more sensors related to the environment;

obtaining at least one of initiation gesture information, position information, and face direction information related to one or more users present in the environment, based on the sensor information;

determining a listening zone surrounding the one or more users based on the position information and the face direction information;

obtaining the target position, among positions within the listening zone, at which the robotic speaker is to be positioned in the environment to provide audio output to the one or more users by performing a calibration process based on the at least one of the initiation gesture information, the position information, or the face direction information and one or more acoustic properties of the environment; and moving, by a robotic device, the robotic speaker through the environment to the target position.

* * * * *